US012601876B2

(12) United States Patent
Morishima et al.

(10) Patent No.: US 12,601,876 B2
(45) Date of Patent: Apr. 14, 2026

(54) OPTICAL FIBER ALIGNMENT METHOD AND ALIGNMENT DEVICE, AND CONNECTION DEVICE

(71) Applicant: SUMITOMO ELECTRIC INDUSTRIES, LTD., Osaka (JP)

(72) Inventors: Tetsu Morishima, Osaka (JP); Shintaro Mouri, Osaka (JP); Soichi Endo, Osaka (JP); Akinori Kimura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 257 days.

(21) Appl. No.: 18/563,702

(22) PCT Filed: Jul. 14, 2022

(86) PCT No.: PCT/JP2022/027744
§ 371 (c)(1),
(2) Date: Nov. 22, 2023

(87) PCT Pub. No.: WO2023/008214
PCT Pub. Date: Feb. 2, 2023

(65) Prior Publication Data
US 2024/0272360 A1 Aug. 15, 2024

(30) Foreign Application Priority Data

Jul. 27, 2021 (JP) ................................. 2021-122432

(51) Int. Cl.
G02B 6/255 (2006.01)
G02B 6/38 (2006.01)
G02B 6/42 (2006.01)

(52) U.S. Cl.
CPC ......... G02B 6/2555 (2013.01); G02B 6/3803 (2013.01); G02B 6/4221 (2013.01); G02B 6/4227 (2013.01)

(58) Field of Classification Search
None
See application file for complete search history.

(56) References Cited

U.S. PATENT DOCUMENTS 10,025,032 B2 * 7/2018 Hamaguchi .......... G02B 6/2553
10,620,372 B2 * 4/2020 Matsui ................... G01B 11/27
(Continued)

FOREIGN PATENT DOCUMENTS

CN 103645537 A 3/2014
JP 2002-169050 A 6/2002
(Continued)

*Primary Examiner* — Jerry Rahll
(74) *Attorney, Agent, or Firm* — Oliff PLC

(57) ABSTRACT

An optical fiber alignment method makes it possible to reduce the time required for alignment work for an optical fiber. This alignment method includes: an image acquisition step of acquiring an end surface image of an optical fiber; a measurement step of measuring arrangement data relating to a plurality of elements from the end surface image; a calculation step of calculating an amount of deviation of each of the plurality of elements from a target element arrangement from a correspondence relationship of the elements between the obtained arrangement data and reference arrangement data for element identification recorded in advance; and an alignment step of rotating the optical fiber around a central axis such that the obtained amount of deviation is reduced.

11 Claims, 10 Drawing Sheets

(56) References Cited

U.S. PATENT DOCUMENTS

| | | | |
|---|---|---|---|
| 2004/0047572 A1 | 3/2004 | Hattori | |
| 2010/0209049 A1 | 8/2010 | Zheng et al. | |
| 2012/0328252 A1* | 12/2012 | Howell | G02B 6/2555 |
| | | | 385/98 |
| 2015/0055923 A1 | 2/2015 | Saito et al. | |
| 2022/0350092 A1* | 11/2022 | Lawson | G02B 6/4227 |

FOREIGN PATENT DOCUMENTS

| | | | |
|---|---|---|---|
| JP | 2004-012799 A | 1/2004 |
| JP | 2006-106778 A | 4/2006 |
| JP | 2013-029758 A | 2/2013 |
| JP | 2013-050695 A | 3/2013 |
| JP | 2014-123157 A | 7/2014 |
| JP | 2020-144301 A | 9/2020 |

* cited by examiner

| STEP | END SURFACE IMAGE 100A | STEP | END SURFACE IMAGE 100A |
|------|------------------------|------|------------------------|
| ST1 | AX | ST2 | AX |
| ST3 | AX | ST4 | 111  #2  AX  #1 |
| ST5 | #2  111  +θ  AX  #1 | ST6 | S5  111  #1  #2  AX |

*Fig.10*

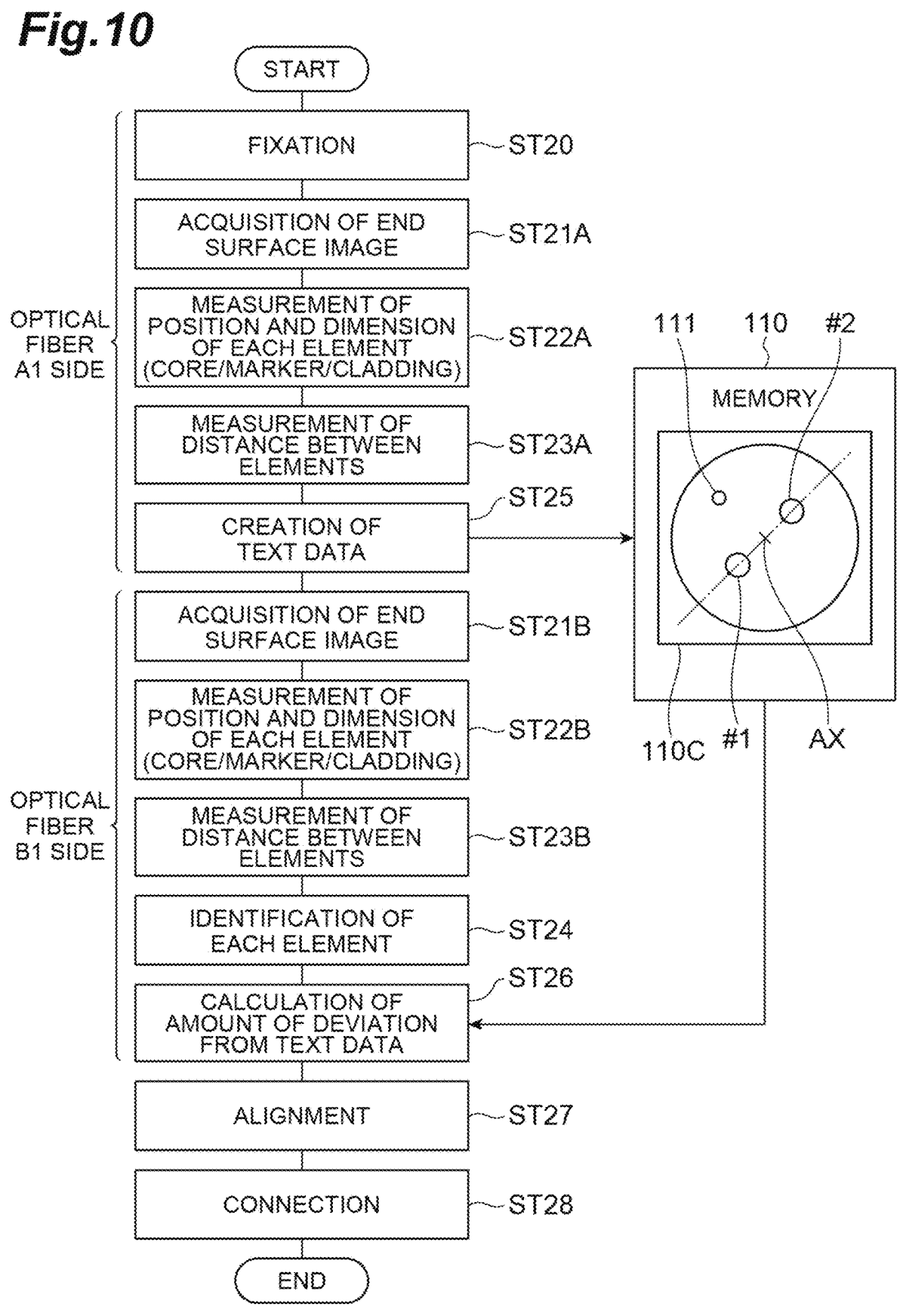

START

FIXATION — ST20

ACQUISITION OF END SURFACE IMAGE — ST21A

MEASUREMENT OF POSITION AND DIMENSION OF EACH ELEMENT (CORE/MARKER/CLADDING) — ST22A

MEASUREMENT OF DISTANCE BETWEEN ELEMENTS — ST23A

CREATION OF TEXT DATA — ST25

OPTICAL FIBER A1 SIDE

ACQUISITION OF END SURFACE IMAGE — ST21B

MEASUREMENT OF POSITION AND DIMENSION OF EACH ELEMENT (CORE/MARKER/CLADDING) — ST22B

MEASUREMENT OF DISTANCE BETWEEN ELEMENTS — ST23B

IDENTIFICATION OF EACH ELEMENT — ST24

CALCULATION OF AMOUNT OF DEVIATION FROM TEXT DATA — ST26

OPTICAL FIBER B1 SIDE

ALIGNMENT — ST27

CONNECTION — ST28

END

MEMORY 111     110     #2

110C     #1     AX

OPTICAL FIBER ALIGNMENT METHOD AND ALIGNMENT DEVICE, AND CONNECTION DEVICE

TECHNICAL FIELD

The present disclosure relates to an optical fiber alignment method, an alignment device, and a connection device.
This application is based upon and claims the benefit of priority from Japanese Patent Application No. 2021-122432, filed on Jul. 27, 2021, the entire contents of which are incorporated herein by reference.

BACKGROUND ART

In the related art, in the work of optically connecting two optical fibers to each other, alignment work is performed for each of the two optical fibers by analyzing end surface images of the two optical fibers and performing pattern matching between the end surface images.

For example, in an alignment method of Patent Document 1, as disclosed in paragraphs "0069" and "0070" and FIG. 8, two multi-core optical fibers (hereinafter referred to as "MCFs") to be optically connected to each other are disposed such that the end surfaces thereof face each other. A mirror is disposed between the two MCFs. The mirror has a reflective surface inclined at an angle of about 45° with respect to each of the end surfaces of the two MCFs, and the end surface image of each of the two MCFs is reflected toward a camera. A core, a cladding, and a marker are displayed on a monitor as elements that constitute the end surface. Therefore, the positions of the cores between the two MCFs are rotationally aligned by relatively rotating both or one of the two MCFs such that the positions of these elements match each other between the two MCFs (alignment work).

CITATION LIST

Patent Literature

[Patent Document 1] Japanese Patent Application Laid-Open No. 2013-050695
[Patent Document 2] Japanese Patent Application Laid-Open No. 2004-12799

SUMMARY OF INVENTION

An optical fiber alignment method of the present disclosure is for moving a plurality of elements constituting an end surface of an optical fiber that is an object of alignment to arbitrarily set target positions by rotating the optical fiber around a central axis of the optical fiber. Specifically, the alignment method includes an image acquisition step, a measurement step, a calculation step, and an alignment step. In the image acquisition step, an end surface image of the optical fiber is acquired. In the measurement step, arrangement data relating to the plurality of elements is measured from the end surface image of the optical fiber. In the calculation step, the amount of deviation of each of the plurality of elements from a target element arrangement in which the plurality of elements should be located is calculated from a correspondence relationship of the elements between the arrangement data and reference arrangement data for element identification recorded in advance. In the alignment step, alignment of the optical fiber is performed by rotating the optical fiber around the central axis such that the amount of deviation is reduced.

BRIEF DESCRIPTION OF DRAWINGS

FIG. 1 is a view showing external appearances (a partially broken view is included) and cross-sectional structures of various optical fibers applicable to an optical fiber alignment method according to the present disclosure and the like (including fixation of the optical fiber after alignment and connection between the optical fibers disposed to face each other).

FIG. 8 is a view showing a state of the end surface image of the optical fiber (an element arrangement) in each step of the flowchart shown in FIG. 7.

FIG. 10 is a flowchart for explaining a third embodiment of the optical fiber alignment method according to the present disclosure and the like (including fixation of the optical fiber after alignment and connection between the optical fibers disposed to face each other).

DESCRIPTION OF EMBODIMENTS

Problems to be Solved by Invention

Figure 2:
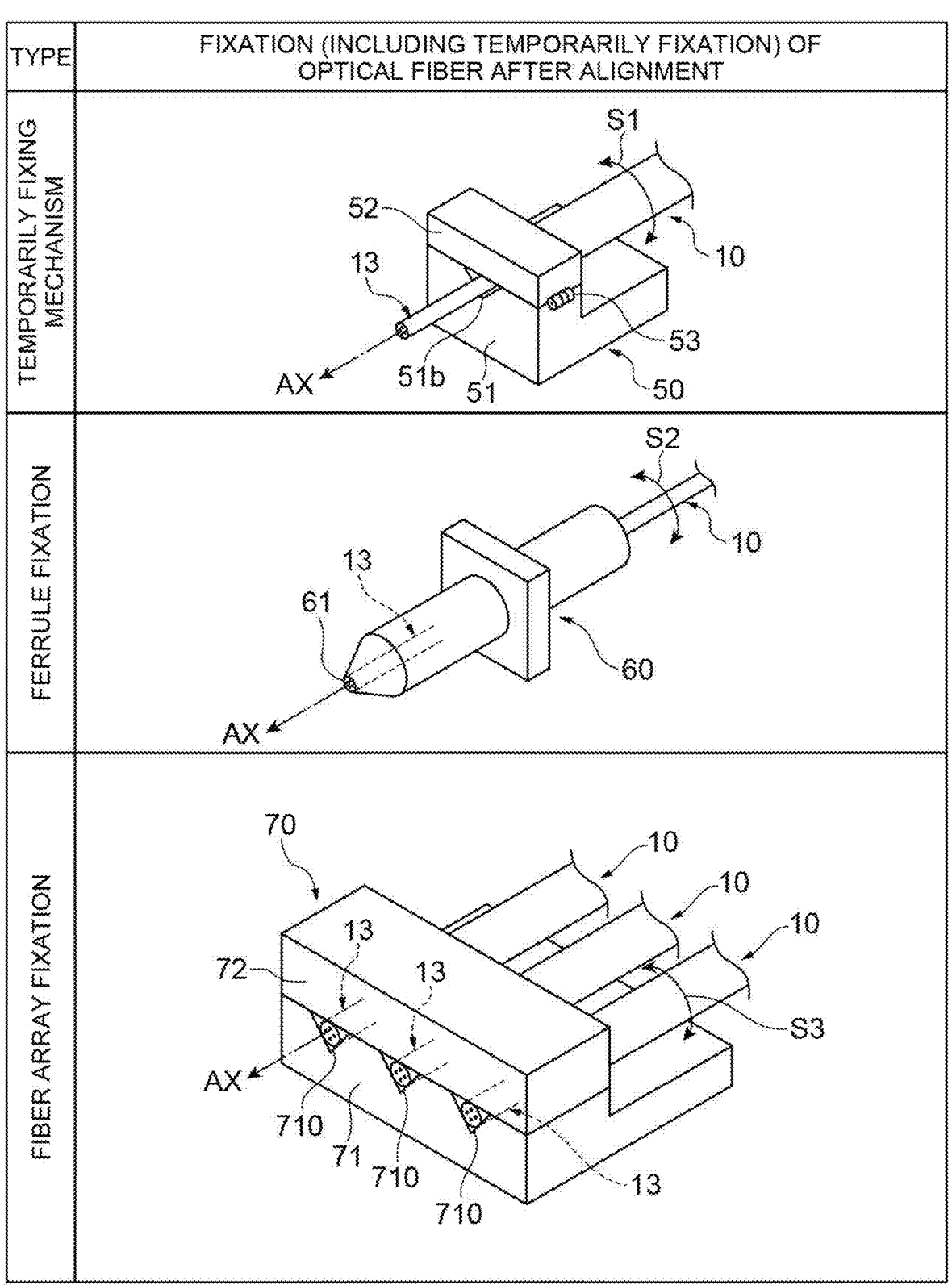
FIG. 2 is a view showing various configuration examples of a fixing jig (included in a connection device of the present disclosure) for fixing (including temporarily fixing) the optical fiber after alignment.

As a result of examining the above-described prior art, the inventors discovered the following problems. That is, according to the above-described prior art, in the alignment work of two MCFs to be optically connected to each other, since it is necessary to determine the amount of rotation of each of the MCFs after analysis of end surface images of the two MCFs and pattern matching between the end surface images are performed, there is a problem that the alignment work is complicated and takes a long processing time. This is because the entire end surface image is set as a scanning region for a search operation as a range in which a search operation for a plurality of elements constituting an end surface is performed, and thus it takes time to search for similar elements and to align the similar elements.

The present disclosure has been made to solve the problems described above, and an object of the present disclosure is to provide an optical fiber alignment method, an alignment device, and a connection device that can shorten the time required for alignment work on an optical fiber.

Effects of Invention

According to the optical fiber alignment method of the present disclosure, since a measurement step is executed using reference arrangement data, which is the known arrangement data, the amount of calculation associated with the alignment work is suppressed, and as a result, the time required for the alignment work itself can be shortened.

Description of Embodiments of the Present Disclosure

First, each correspondence of embodiments of the present disclosure will be individually listed and described. The gist of the optical fiber alignment method of the present disclosure is that information about the end surface structure of the optical fiber that is an object of alignment is recorded in advance, information about the structural features extracted on the basis of the recorded information is used, and then alignment work is performed from the obtained end surface image. More specifically, the coordinates of a core, a marker, the center of an end surface (the center of a cladding), and the like of the fiber are extracted from the light-and-dark pattern of the end surface image, each element is identified and determined on the basis of a positional relationship between the elements that constitute the end surface (the center coordinates of the elements, the dimensions of the elements, and the center-to-center distance between the elements (including the distance from the center of the end surface to the center of each element)), and the adjustment amount for alignment is calculated.

The optical fiber alignment method of the present disclosure is applicable with respect to a plurality of settings. A first setting is for moving a plurality of elements constituting an end surface of an optical fiber that is an object of alignment to arbitrarily set target positions by rotating the optical fiber around a central axis of the optical fiber. In this first setting, the elements of the optical fiber (the object of alignment) are identified using known reference arrangement data recorded in advance, and a reference element arrangement defined by this reference arrangement data is set as a target element arrangement that serves as an alignment target. A second setting is for moving the plurality of elements constituting the end surface of the object of alignment to the arbitrarily set target positions by selecting both of first and second optical fibers to be optically connected to each other or the second optical fiber as the object of alignment and rotating the object of alignment around the central axis of the object of alignment. In this second setting, the reference arrangement data that is the known arrangement data recorded in advance is used in the identification of the plurality of elements of both or one of the first and second optical fibers. However, in the target element arrangement, the reference arrangement data may be set, or the element arrangement of any one of the first and second optical fibers may be set. For example, in a third setting as an application of the second setting, the second optical fiber is selected as the object of alignment in a state where the element arrangement of the first optical fiber is fixed as the target element arrangement. In this third setting, the adjustment amount for alignment (the amount of deviation between the element arrangement of the first optical fiber which is the target element arrangement, and the element arrangement of the second optical fiber that is the object of alignment) is calculated from the intermediate amount of deviation of the element arrangement of each of the first and second optical fibers from the reference element arrangement defined by the reference arrangement data. Further, also in a fourth setting as an application of the second setting, the second optical fiber is selected as the object of alignment in a state where the element arrangement of the first optical fiber is fixed as the target element arrangement. However, in this fourth setting, as the adjustment amount for alignment, the amount of deviation of the element arrangement of the second optical fiber that is the object of alignment and whose elements are identified by the reference arrangement data from the element arrangement of the first optical fiber, which is the target element arrangement, is directly calculated. Furthermore, also in a fifth setting as an application of the second setting, the second optical fiber is selected as the object of alignment in a state where the element arrangement of the first optical fiber is fixed as the target element arrangement. However, this fifth setting is characterized in that the reference arrangement data is obtained by measuring the element arrangement of any one of the first and second optical fibers (a reference optical fiber) prior to alignment. For this reason, in this fifth setting, the identification of the other plurality of elements is performed using the reference arrangement data that has been measured and recorded in advance.

In this specification, "target element arrangement" means an arrangement in which each of the elements in the end surface of the optical fiber after alignment is to be located (an element arrangement), and it is directly or indirectly used as a reference for calculating the amount of deviation in a calculation step. The elements that constitute the "target element arrangement" are expressed as "target elements," and the positions of the "target elements" on the fiber end surface are expressed as "target positions". In addition, the "reference element arrangement" is used as an identification reference of the elements in an identification step and is defined by "reference arrangement data" recorded in advance as master data. The elements that constitute the "reference element arrangement" are expressed as "reference elements," and the "reference arrangement data" includes structural data such as the center positions of the reference elements, the dimensions of the reference elements, and the center-to-center distance between the reference elements and also includes azimuth information for determining the rotation angle indicating the rotation state of the element arrangement on the object. The "reference element arrangement" indicated by this "reference arrangement data" may be set as the "target element arrangement."

(1) As one aspect of the present disclosure, an alignment method to which the first setting is applied includes an image acquisition step, a measurement step, a calculation step, and an alignment step. In the image acquisition step, an end surface image of the optical fiber is acquired. In the measurement step, arrangement data relating to the plurality of elements is measured from the end surface image of the optical fiber. In the calculation step, the amount of deviation of each of the plurality of elements from a target element arrangement in which the plurality of elements should be located is calculated from a correspondence relationship of the elements between the arrangement data and reference arrangement data for element identification recorded in advance (the known arrangement data recorded in advance). In the alignment step, alignment of the optical fiber is performed by rotating the optical fiber around the central axis such that the amount of deviation is reduced. According to the optical fiber alignment method of the present disclosure in the first setting, with the configuration described above, the measurement step is executed using the known reference arrangement data, and thus the amount of calculation associated with the alignment work is suppressed, and as a result, the time required for the alignment work itself can be shortened.

(2) As one aspect of the present disclosure, in a case where the second setting is applied, both of first and second optical fibers to be optically connected to each other or the second optical fiber is selected as the object of alignment. Under such a setting, in the image acquisition step, any one of a first operation and a second operation is executed. In the measurement step, any one of a third operation and a fourth operation is executed. In the calculation step, any one of a fifth operation and a sixth operation is executed. Further, in the alignment step, alignment between the first and second optical fibers is performed by rotating the object of alignment around the central axis such that the amount of deviation is reduced, and an element arrangement of a plurality of elements constituting an end surface of the first optical fiber and an element arrangement of a plurality of elements constituting an end surface of the second optical fiber overlap each other. The first operation is defined by acquiring an end surface image of each of the first and second optical fibers as the end surface image of the optical fiber. The second operation is defined by acquiring an end surface image of any one of the first and second optical fibers as the end surface image of the optical fiber. The third operation is defined by measuring the arrangement data from the end surface image of each of the first and second optical fibers. In the fourth operation, the arrangement data is measured from the end surface image of any one of the first and second optical fibers. The fifth operation is defined by specifying the correspondence relationship for each element between the arrangement data of the first optical fiber and the reference arrangement data and by specifying the correspondence relationship for each element between the arrangement data of the second optical fiber and the reference arrangement data. The sixth operation is defined by specifying the correspondence relationship for each element between the arrangement data of any one of the first and second optical fibers and the reference arrangement data. Even with the configuration described above, the measurement step is executed using the known reference arrangement data, and thus the amount of calculation associated with the alignment work is suppressed, and as a result, the time required for the alignment work itself can be shortened.

(3) As one aspect of the present disclosure, in a case where the third setting is applied, the second optical fiber is selected as the object of alignment in a state where the element arrangement of the first optical fiber is fixed as the target element arrangement. Under such a setting, in the image acquisition step, the first operation is executed. In the measurement step, the third operation is executed. In the calculation step, the fifth operation is executed, specifically, an intermediate amount of deviation of the element arrangement of each of the first and second optical fibers from the element arrangement of a plurality of reference elements defined by the reference arrangement data is calculated on the basis of the correspondence relationship, and then an amount of deviation between the element arrangement of the second optical fiber and the element arrangement of the first optical fiber is calculated on the basis of the intermediate amount of deviation. According to this configuration, it is possible to bring the element arrangement constituted by the plurality of elements of each of the first and second optical fibers to be optically connected to each other close to arbitrarily settable target element arrangement.

(4) As one aspect of the present disclosure, also in a case where the fourth setting is applied, the second optical fiber is selected as the object of alignment in a state where the element arrangement of the first optical fiber is fixed as the target element arrangement. Under such a setting, in the image acquisition step, the first operation is executed. In the measurement step, the third operation is executed. In the calculation step, the fifth operation is executed, specifically, an amount of deviation of the element arrangement of the second optical fiber in the end surface image from the element arrangement of the first optical fiber in the end surface image is calculated on the basis of the correspondence relationship. In a case where two optical fibers are optically connected to each other in this way, in the calculation of the "amount of deviation," the element arrangement itself in the end surface image of the first optical fiber is set to the target element arrangement, and thus the amount of calculation can be reduced.

(5) As one aspect of the present disclosure, in a case where the fifth setting is applied, the second optical fiber is selected as the object of alignment in a state where the element arrangement of the first optical fiber is fixed as the target element arrangement. Under such a setting, the alignment method further includes a reference image acquisition step and a reference arrangement data measurement step in order to obtain the reference arrangement data. In the reference image acquisition step, an end surface image of a reference optical fiber selected from a group of first and second optical fibers is acquired. In the reference arrangement data measurement step, arrangement data relating to a plurality of elements constituting the end surface of the reference optical fiber measured and recorded as the reference arrangement data from the end surface image of the reference optical fiber.

Further, in the image acquisition step, the second operation is executed, specifically, an end surface image of a non-selected optical fiber different from the reference optical fiber selected from the group of the first and second optical fibers is acquired as the end surface image of the optical fiber. In the measurement step, the fourth operation is executed, specifically, arrangement data relating to a plurality of elements constituting an end surface of the non-selected optical fiber is measured as the arrangement data of the optical fiber from the end surface image of the non-selected optical fiber. In the calculation step, the sixth operation is executed, specifically, a correspondence relationship between the plurality of elements of the non-selected optical fiber and a plurality of reference elements defined by the reference arrangement data is specified as the correspondence relationship described above on the basis of a comparison between the arrangement data of the non-selected optical fiber and the reference arrangement data. Further, in the calculation step, an amount of deviation between an element arrangement constituted by the plurality of elements of the non-selected optical fiber and the target element arrangement is calculated. In this way, the calculation of the "amount of deviation" between the first and second optical fibers, the element arrangement itself in the end surface image of any one of the two optical fibers to be optically connected to each other may be set to the target element arrangement, and also in this case, the amount of calculation can be reduced.

(6) As an aspect (a first application example) of the present disclosure that can also be applied to any setting of the first setting to the fifth setting described above, the target element arrangement serving as a reference for calculating the amount of deviation in the calculation step is preferably an element arrangement of a plurality of reference elements defined by the known reference arrangement data recorded in advance. In this case, since the reference arrangement data is shared in both the identification step and the calculation step, efficient utilization of resources becomes possible.

(7) As an aspect (a second application example) of the present disclosure that can also be applied to any setting of the first setting to the fifth setting described above, in the measurement of the arrangement data in the measurement step described above, a scanning region of a pixel search (a region in which a pixel search is performed for each of pixels constituting the end surface image) is preferably set on the end surface image on the basis of the known reference arrangement data recorded in advance as a range in which a search for pixels constituting the plurality of elements among pixels of the end surface image is performed. In this way, by using the known reference arrangement data, the scanning region can be reduced, and the amount of calculation required for measuring the arrangement data can be further suppressed (the time required for the alignment work can be shortened). This second application example can be implemented in combination with the first application example.

(8) As an aspect (a third application example) of the present disclosure that can also be applied to any setting of the first setting to the fifth setting described above, the arrangement data measured in the measurement step is preferably two-dimensional data on an end surface of the optical fiber that is the object of alignment, specifically, preferably includes center position data of each of the plurality of elements, dimension data of each of the plurality of elements, and center-to-center distance data between the plurality of elements. The reference arrangement data is the known arrangement data relating to the plurality of elements. Further, the correspondence relationship between the elements between the measured arrangement data and the known reference placement data is determined by determining the types of the plurality of elements displayed on the end surface image and comparing the positional relationships between the elements between the measured arrangement data and the known reference arrangement data, and as a result, the plurality of elements on the end surface image can be identified. Specifically, the type of each of the plurality of elements is determined on the basis of a comparison between the dimension data included in the reference arrangement data and the dimension data included in the measured arrangement data. Further, objects of comparison of the positional relationships are a positional relationship of a plurality of reference elements defined by the center position data and the center-to-center distance data included in the reference arrangement data and a positional relationship of the plurality of elements included in the measured arrangement data. In this way, by referring to the positional relationship including the dimensions of the core, the marker, and the like recorded in advance and the actually measured positional relationship, the amount of calculation associated with the alignment work can be effectively suppressed. This third application example can also be implemented in combination with one or more of the first application example and the second application example.

(9) As an aspect (a fourth application example) of the present disclosure that can also be applied to any setting of the first setting to the fifth setting described above, the object of alignment preferably includes at least one of a multi-core optical fiber, a polarization-maintaining fiber, and a bundle fiber. Any object of alignment also has an end surface structure (including a plurality of elements) that requires alignment by rotation with respect to an optical connector, a fixing member such as a fiber array, and another optical fiber to be optically connected, and thus the alignment method is effective. This fourth application example can also be implemented in combination with one or more of the first application example to the third application example described above.

(10) The alignment device of the present disclosure implements the various aspects of the optical fiber alignment method described above. According to the alignment device, the time required for the alignment work can be shortened, thereby making it possible to improve the efficiency of the connection or fixing work following the alignment work. More specifically, the alignment device is a device for moving a plurality of elements constituting an end surface of an optical fiber that is an object of alignment to arbitrarily set target positions by rotating the optical fiber around a central axis of the optical fiber and includes an image acquisition unit, a control unit, and an alignment unit. In order to implement the optical fiber alignment method of the present disclosure formed by combining various aspects in any one of the first setting to the fifth setting described above, the control unit has a measurement unit, an identification unit, and a calculation unit. The image acquisition unit acquires an end surface image of the optical fiber with respect to the optical fiber. The measurement unit measures center position data of each of the plurality of elements, dimension data of each of the plurality of elements, and center-to-center distance data between the plurality of elements as arrangement data relating to the plurality of elements from the end surface image acquired by the image acquisition unit of the optical fiber. The identification unit identifies the plurality of elements in the end surface image by comparing the arrangement data of the optical fiber with reference arrangement data that is the known arrangement data relating to the plurality of elements recorded in advance and specifying a correspondence relationship between the plurality of elements in the end surface image and a plurality of reference elements defined by the reference arrangement data. The calculation unit calculates an amount of deviation of an element arrangement constituted by the plurality of elements in the end surface image from a target element arrangement constituted by a plurality of target elements located at the target positions on the basis of the identification result obtained by the identification unit. The alignment unit performs alignment of the optical fiber by rotating the optical fiber around the central axis such that the amount of deviation obtained by the calculation unit is reduced. In the alignment device, one or more temporarily fixing jigs are prepared corresponding to each of one or more optical fibers including the optical fiber that is the object of alignment. Each temporarily fixing jig detachably holds the associated optical fiber. As in the second setting to the fifth setting, in the configurations in which the first optical fiber and the second optical fiber are provided, first and second temporarily fixing jigs that individually hold each of the first optical fiber and the second optical fiber are provided.

(11) A connection device of the present disclosure may include an alignment device for implementing the optical fiber alignment methods of the various aspects described above and may further include a fixing jig for holding the element arrangement of the object of alignment aligned by the alignment device. With this configuration, it is possible to shorten the time required for connection work between two or more optical fibers, including the alignment work.

(12) In an aspect of the connection device, the fixing jig preferably includes any one of a temporarily fixing jig that detachably holds the object of alignment, a ferrule that is installed on a tip end portion of the object of alignment including the end surface and constitutes a part of an optical connector, and a fiber array in which tip end portions of a plurality of optical fibers including the object of alignment are installed. Also with this configuration, it possible to shorten the time required for connection work between two or more optical fibers, including the alignment work.

(13) A connection device of the present disclosure can also optically connect the first and second optical fibers including the object of alignment aligned by the optical fiber alignment method according to the various aspects described above to each other in a state where the element arrangement of each of the first and second optical fibers is held. In this case, it is possible to improve the efficiency of connection work between two optical fibers, including the alignment work.

(14) In an aspect of the connection device, the connection device may include a fusion device for fusion connecting the end surface of the first optical fiber and the end surface of the second optical fiber to each other. Also in this case, it is possible to improve the efficiency of connection work between two optical fibers, including the alignment work. In particular, since the temporarily fixing jig can temporarily hold the alignment state of the first and second optical fibers, it is effective when the first and second optical fibers are thermally fused by the above fusion device.

(15) In an aspect of the connection device, the connection device may include a mechanical splice element for optically connecting the first and second optical fibers to each other via a refractive index matching agent. It is possible to improve the efficiency of connection work between two optical fibers, including the alignment work.

As described above, each aspect listed in this field of [Description of embodiments of the present disclosure] is applicable to one of all the remaining aspects, or to all combinations of these remaining aspects.

DETAILS OF EMBODIMENTS OF THE PRESENT DISCLOSURE

Hereinafter, an optical fiber alignment method and specific structures of an alignment device and a connection device according to the present disclosure will be described in detail with reference to the accompanying drawings. The present invention is not limited to these examples, but is defined by the scope of the claims, and is intended to include meanings equivalent to the scope of the claims and all modifications within the scope. In addition, the same elements will be denoted by the same reference signs in the description of the drawings, without redundant description.

The optical fiber alignment method of the present disclosure is suitable for alignment of an object that has a refractive index changing portion inside and has a structure in which the refractive index changing portion has a degree of freedom in an azimuth around a fiber axis (a central axis) such as a multi-core optical fiber (MCF). Specific examples of the object of alignment include a polarization-maintaining fiber, a bundle fiber, and the like, in addition to the MCF described above. The optical fiber alignment method of the present disclosure is also applicable to alignment of a ferrule (included in an optical connector), a fiber array, or the like, which is necessary to match a predetermined core arrangement (a target arrangement). Furthermore, the optical fiber alignment method of the present disclosure can be also applied for alignment between two optical fibers such as fusion connection and alignment between fiber arrays.

Figure 1:
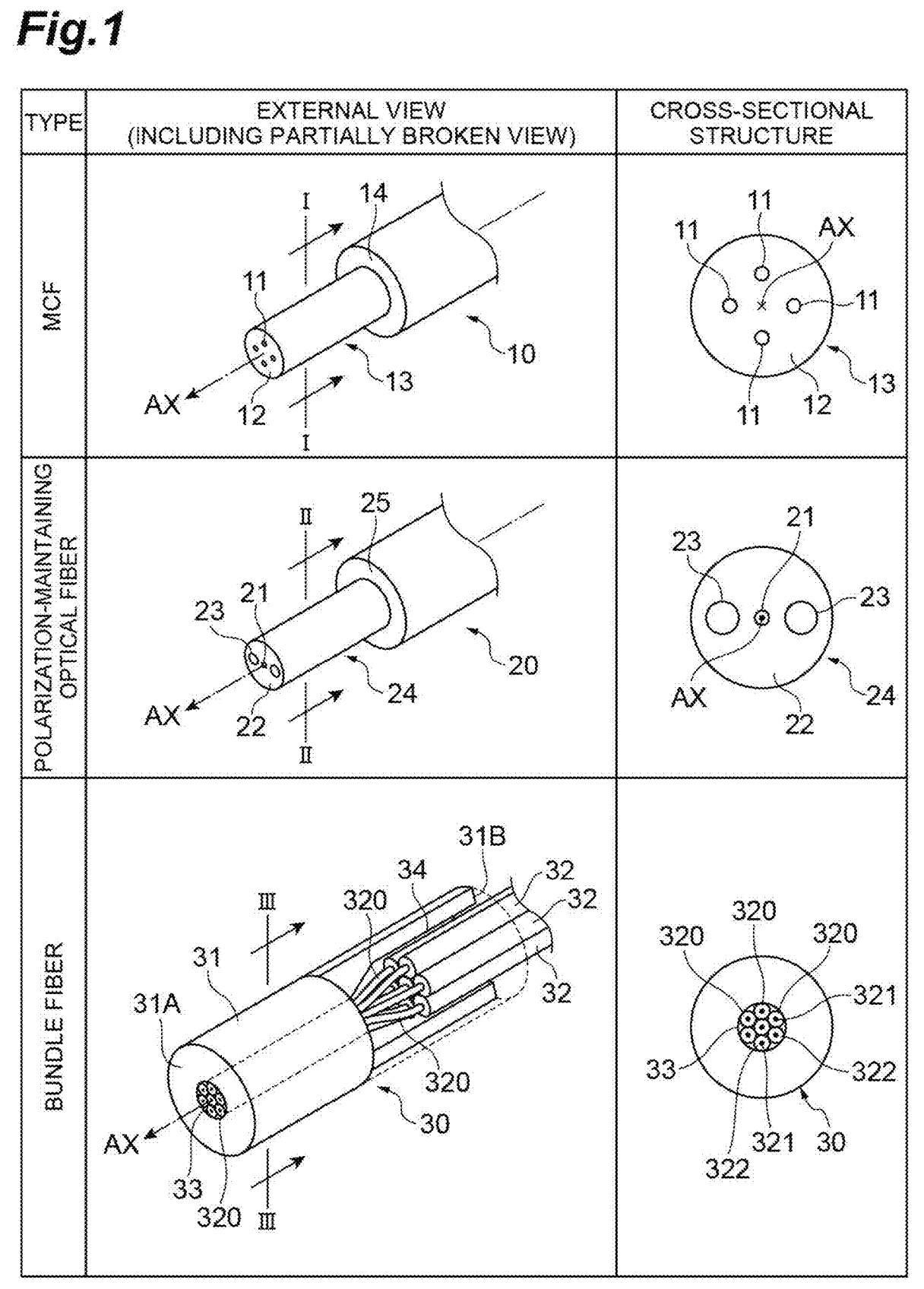

FIG. 1 is a view showing external appearances (a partially broken view is included) and cross-sectional structures of various optical fibers applicable to the optical fiber alignment method according to the present disclosure and the like (including fixation of the optical fiber after alignment and connection between the optical fibers disposed to face each other). The upper part of FIG. 1 shows an external view of an MCF 10 and a cross-sectional structure of the MCF 10 along line I-I shown in the external view. The middle part of FIG. 1 shows an external view of a polarization-maintaining optical fiber 20 and a cross-sectional structure of the polarization-maintaining optical fiber 20 along line II-II shown in the external view. The lower part of FIG. 1 shows an external view of a bundle fiber 30 and a cross-sectional structure of the bundle fiber 30 along line III-III shown in the external view.

The MCF 10 shown in the upper part of FIG. 1 includes a glass fiber 13 extending along a fiber axis AX (a central axis) and a resin coat 14 provided on the outer peripheral surface of the glass fiber 13. The glass fiber 13 includes a plurality of cores 11 extending along the fiber axis AX and a common cladding 12 surrounding each of the plurality of cores 11. In the cross section of the MCF 10 orthogonal to the fiber axis AX, the fiber axis AX passes through the center of the cross section of the common cladding 12.

The polarization-maintaining optical fiber 20 shown in the middle part of FIG. 1 includes a glass fiber 24 extending along the fiber axis AX and a resin coat 25 provided on the outer peripheral surface of the glass fiber 24. The glass fiber 24 includes a core 21 extending along the fiber axis AX, stress applying portions 23 disposed to have the core 21 sandwiched therebetween, and a cladding 22 surrounding the core 21 and each of the stress applying portions 23. In the cross section of the polarization-maintaining optical fiber 20 orthogonal to the fiber axis AX, the fiber axis AX is included in the core 21 and passes through the center of the cross section of the cladding 22.

The bundle fiber 30 shown in the lower part of FIG. 1 includes a housing 31 and a plurality of single-core optical fibers 32 (hereinafter referred to as an "SCF"). The housing 31 has a front end surface 31A and a rear end surface 31B opposite to the front end surface 31A. Furthermore, the housing 31 has a front opening 33 provided in the front end surface 31A, and an accommodation space 34 for accommodating the plurality of SCFs 32 with their tip end portions bundled. Resin coats are removed from the tip end portions (glass fibers 320) of the plurality of SCFs 32, and the end surfaces of the plurality of SCFs 32 are positioned in the front opening 33. Therefore, the structure of the front end surface 31A of the bundle fiber 30 is substantially similar to the end surface structure of the MCF 10. Each of the plurality of SCFs includes a glass fiber 320 covered with the resin coat. The glass fiber 320 includes a core 321 and a cladding 322 surrounding the core 321.

FIG. 2 is a view showing various configuration examples of a fixing jig (included in the connection device of the present disclosure) for fixing (including temporarily fixing) the optical fiber after alignment. The connection device of the present disclosure includes a fixing jig for holding an element arrangement in the end surface of the optical fiber after alignment, and, as an application example of the fixing jig, the upper part of FIG. 2 shows a fixed state of the MCF 10 to a temporarily fixing jig 50 used for connection work such as fusion connection (indicated as a "temporarily fixing mechanism" in FIG. 2). The middle part of FIG. 2 shows a fixed state of the MCF 10 to a ferrule 60 that constitutes a part of the optical connector (indicated as "ferrule fixation" in FIG. 2). The lower part of FIG. 2 shows a fixed state of the plurality of MCFs 10 to a fiber array 70 (indicated as "fiber array fixation" in FIG. 2). Although FIG. 2 shows the MCF 10 as an example of an object of alignment to be fixed, various optical fibers shown in FIG. 1 are applicable. Moreover, the fixing jig shown in FIG. 2 can serve as an alignment reference for the MCF 10 and also function as a member that holds the core arrangement in the MCF 10 after alignment.

In the "temporarily fixing mechanism" shown in the upper part of FIG. 2, a tip end portion of the MCF 10 (a portion where the glass fiber 13 is exposed by removing the resin coat 14) is held by the temporarily fixing jig 50. The temporarily fixing jig 50 includes a lower member 51 provided with a V groove 51*b* in which the tip end portion of the MCF 10 is installed, an upper member 52 that presses the tip end portion of the MCF 10 against the V groove 51*b*, and a hinge 53 for rotatably attaching the upper member 52 to the lower member 51. After the MCF 10 is rotated in a circumferential direction indicated by an arrow S1 around the fiber axis AX (after alignment), the tip end portion of the MCF 10 is fixed to the temporarily fixing jig 50, and thus the core arrangement in the end surface of the MCF 10 is held against the temporarily fixing jig 50. The temporarily fixing jig 50 may hold a portion of the MCF 10 covered with the resin coat 14 instead of the tip end portion of the MCF 10.

In the "ferrule fixation" shown in the middle part of FIG. 2, the ferrule 60 that constitutes a part of the optical connector is fixed to the tip end portion (the glass fiber 13) of the MCF 10 from which the resin coat 14 has been removed. After the MCF 10 is rotated in a circumferential direction indicated by an arrow S2 around the fiber axis AX (after alignment), the ferrule 60 is adhered and fixed to the tip end portion of the MCF 10, and thus the core arrangement in the end surface of the MCF 10 (the core arrangement that can be checked on a ferrule end surface 61) is held against the ferrule 60.

In the "fiber array fixation" shown in the lower part of FIG. 2, the tip end portions of the plurality of MCFs 10 from which the resin coat 14 has been removed are held by the fiber array 70. The fiber array 70 includes a lower member 71 provided with V grooves 710 in each of which one of the glass fibers 13 of the plurality of MCFs 10 is installed and an upper member 72 that presses each of the glass fibers 13 against corresponding one of the V grooves 710. Each of the plurality of MCFs 10 is rotated in a direction indicated by an arrow S3 with the fiber axis AX as the center (alignment). After alignment, each of the plurality of MCFs 10 is adhered and fixed to the fiber array 70 with an adhesive such as an ultraviolet curable resin in a state of being sandwiched between the V groove 710 of the lower member 71 and the upper member 72. As a result, the core arrangement in the end surface of each of the plurality of MCFs 10 is held with respect to the fiber array 70.

Figure 3:
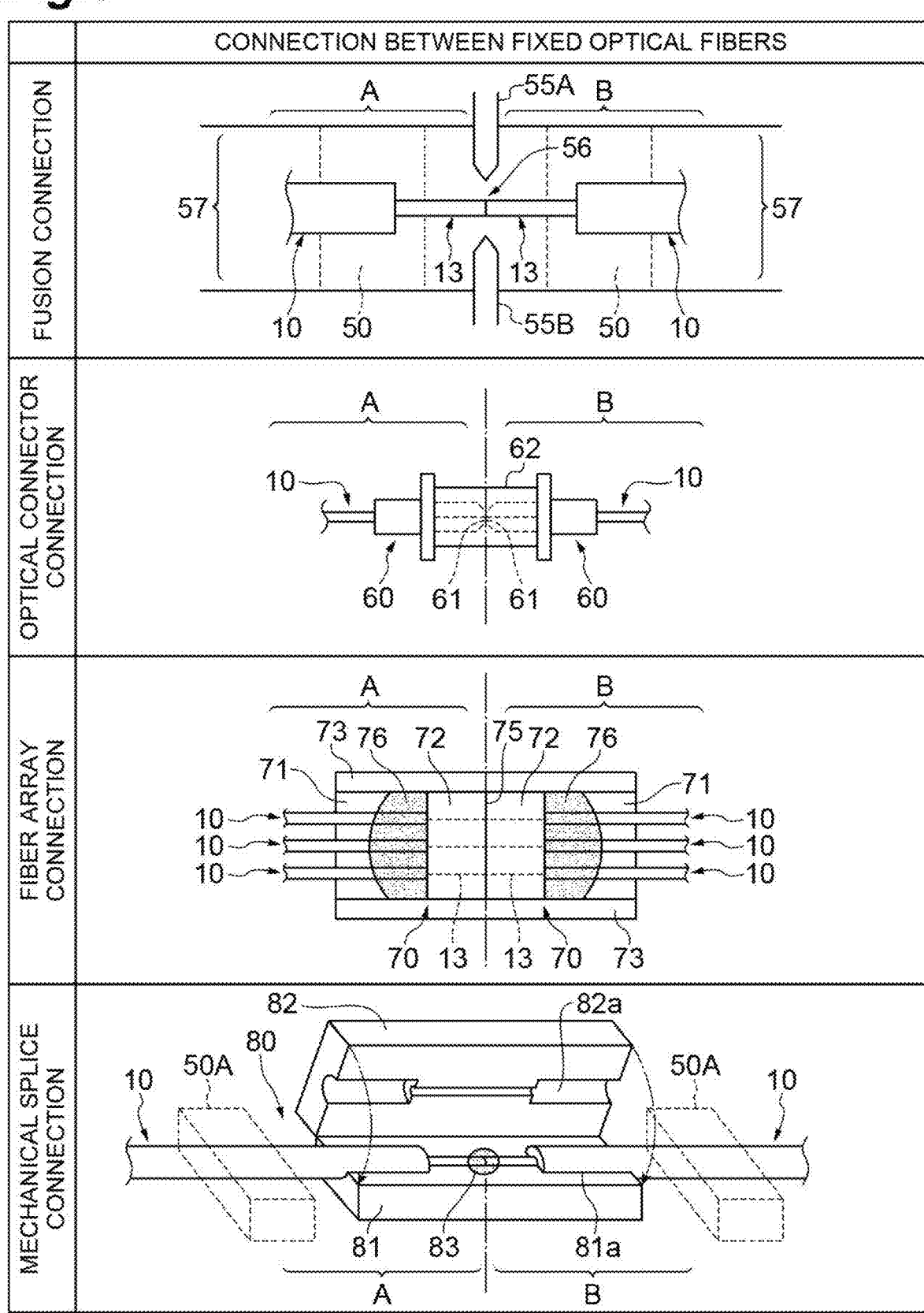
FIG. 3 shows various configurations for making connection between the two aligned and fixed optical fibers (including the connection device of the present disclosure).

FIG. 3 shows various configurations for making connection between the two aligned and fixed optical fibers (including the connection device of the present disclosure). As an application example of the connection device of the present disclosure, an example of connection by a fusion device (indicated as "fusion connection" in FIG. 3) is shown in the uppermost part of FIG. 3. An example of connection by an optical connector (indicated as "optical connector connection" in FIG. 3) is shown in a second part in FIG. 3. An example of connection between the fiber arrays (indicated as "fiber array connection" in FIG. 3) is shown in a third part in FIG. 3. An example of connection by a mechanical splice element (indicated as "mechanical splice connection" in FIG. 3) is shown in the lowermost part in FIG. 3. In FIG. 3, an optical fiber on a fixation side (an optical fiber excluded from the object of alignment) is shown in a region indicated by reference sign "A," and an optical fiber on an alignment side (an optical fiber selected as the object of alignment) is shown in a region indicated by reference symbol "B". However, an optical fiber in any of the regions indicated by reference signs "A" and "B" can be selected as the object of alignment.

In the "fusion connection" shown in the uppermost part of FIG. 3, a simple configuration example of the fusion device for fusion connecting the end surfaces of the MCFs 10 each of which is fixed to the temporarily fixing jig 50 at the tip end portion or the portion covered with the resin coat 14 is shown. The temporarily fixing jig 50 to which the MCF 10 on the fixation side A is fixed and the temporarily fixing jig 50 to which the MCF 10 on the alignment side B is fixed are installed in a guide groove 57. By moving the temporarily fixing jigs 50 on the fixation side A and the alignment side B closer to each other along the guide groove 57, the end surface of the MCF 10 on the fixation side A and the end surface of the MCF 10 on the alignment side B are butted with each other between discharge electrodes 55A and 55B. Due to the discharge generated between the discharge electrodes 55A and 55B, the end surface of the MCF 10 on the fixation side A and the end surface of the MCF 10 on the alignment side B are fusion connected to each other (reference sign "56" in FIG. 3 indicates a fusion portion).

In the "optical connector connection" shown in the second part of FIG. 3, a simple configuration example of the optical connector (the connection device) for optically connecting the end surfaces of the MCFs 10 with the ferrule 60 fixed to the tip end portion of the MCF 10 is shown. The ferrule 60 fixed to the MCF 10 on the fixation side A and the ferrule 60 fixed to the MCF 10 on the alignment side B are accommodated in the sleeve 62. At that time, the respective ferrule end surfaces 61 are held by the sleeve 62 to face each other in contact or at a predetermined distance. In this "optical connector connection," the end surface of the MCF 10 on the fixation side A and the end surface of the MCF 10 on the alignment side B may be in contact with each other or may not be in contact with each other.

In the "fiber array connection" shown in the third part of FIG. 3, a simple configuration example of the connection device for optically connecting the end surfaces of the MCFs 10 each of which is fixed to the fiber array 70 on the fixation side A at the tip end portion and the end surfaces of the MCFs 10 each of which is fixed to the fiber array 70 on the alignment side B at the tip end portion is shown. The fiber array 70 to which the MCFs 10 on the fixation side A are fixed and the fiber array 70 to which the MCFs 10 on the alignment side B are fixed are installed in a guide member 73. The fiber arrays 70 on the fixation side A and the alignment side B are brought close to each other along the guide member 73, and their end surfaces are adhered via an adhesive 76 such as an ultraviolet curable resin to form a joint portion 75. In this "fiber array connection," since the fiber arrays 70 on the fixation side A and the alignment side B are positioned by the guide member 73, the adhesion between these fiber arrays 70 allows the end surfaces of the MCFs 10 on the fixation side A and the end surfaces of the MCFs 10 on the alignment side B to match each other. Both of the fiber arrays 70 on the fixation side A and the alignment side B have the lower member 71 having the V groove 710 for holding the glass fiber 13 of the MCF 10 from which the resin coat 14 has been removed and the upper member 72 that presses the glass fiber 13 against the V groove 710 of the lower member 71, and the MCF 10, the lower member 71, and the upper member 72 are fixed to each other with the adhesive 76 such as the ultraviolet curable resin.

In the "mechanical splice connection" shown in the lowermost part of FIG. 3, a simple configuration example of the connection device for optically connecting the end surfaces of the MCFs 10 each of which is fixed to a temporarily fixing jig 50A at the portion covered with the resin coat 14 is shown. The tip end portion of the MCF 10 fixed to the temporarily fixing jig 50A on the fixation side A and the tip end portion of the MCF 10 fixed to the temporarily fixing jig 50A on the alignment side B are accommodated in a mechanical splice element 80. The mechanical splice element 80 includes a lower member 81 provided with a groove 81a for holding the MCFs 10 on the fixation side A and the alignment side B in a state of being optically connected to each other and an upper member 82 provided with a groove 82a for holding the MCFs 10 on the fixation side A and the alignment side B in a state of being optically connected to each other. The end surfaces of the MCFs 10 on the fixation side A and the alignment side B accommodated in the mechanical splice element 80 are maintained in a state of being optically connected to each other via a refractive index matching agent 83.

Figure 4:
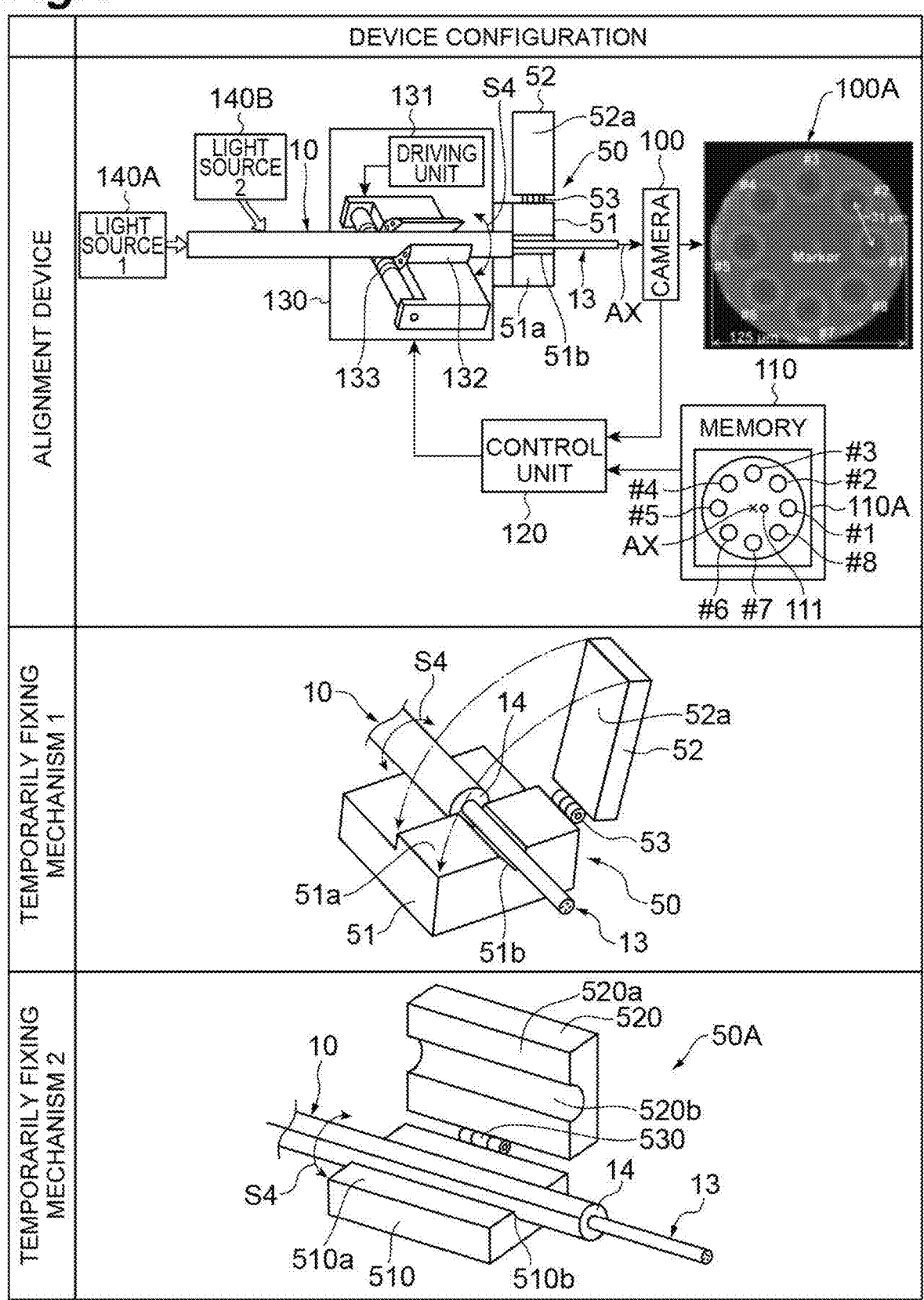
FIG. 4 is a view showing a configuration of an alignment device for acquiring an end surface image of the optical fiber and performing alignment of the optical fiber.
Figure 5:
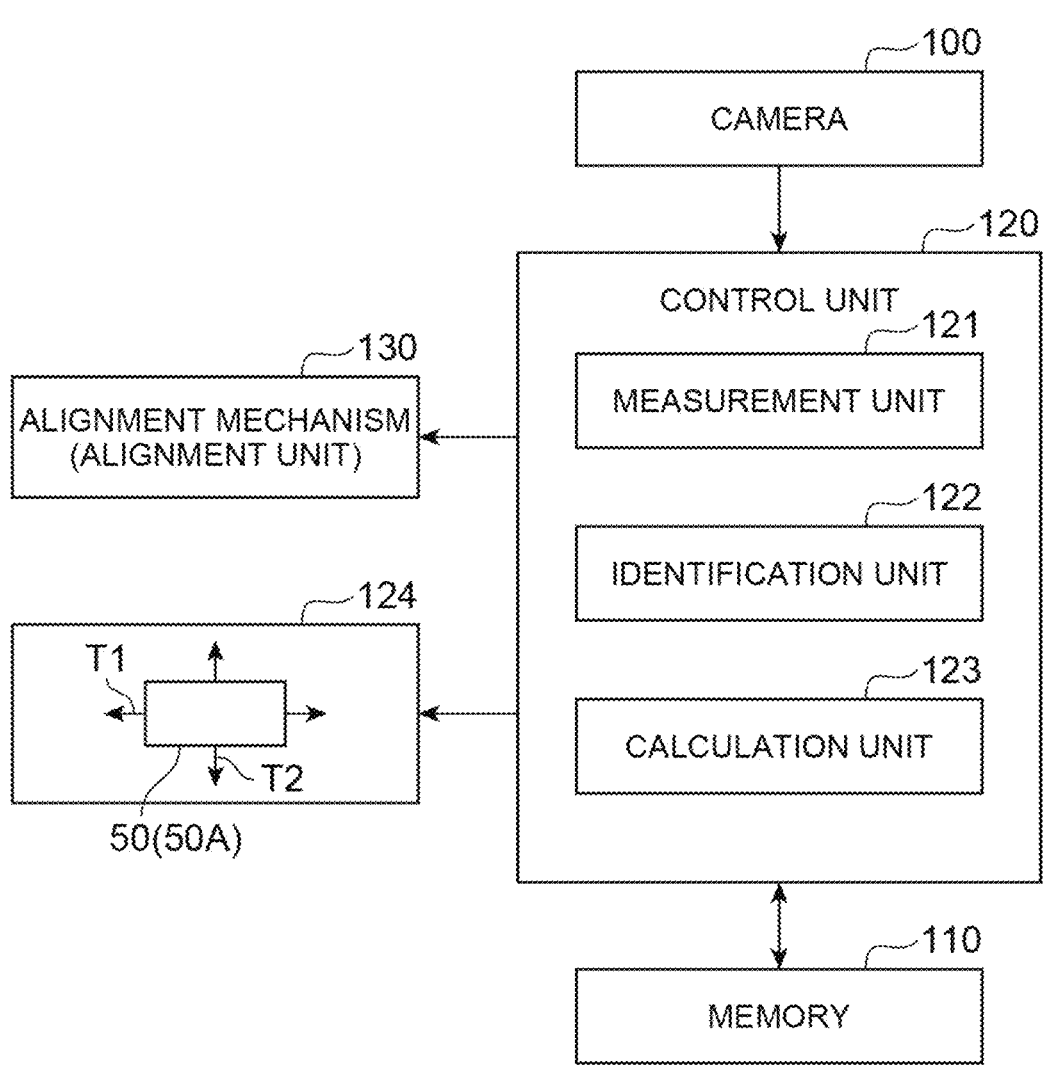
FIG. 5 is a diagram showing an example of a configuration of a control unit.

FIG. 4 is a view showing a configuration of the alignment device for acquiring an end surface image of the optical fiber and performing alignment of the optical fiber. A simple configuration example of the alignment device of the present disclosure (indicated as an "alignment device" in FIG. 4) is shown in upper part of FIG. 4. The temporarily fixing jig 50 (indicated as "temporarily fixing mechanism 1" in FIG. 4) and the temporarily fixing jig 50A (indicated as "temporarily fixing mechanism 2" in FIG. 4) for holding the optical fiber during alignment work and fixing the optical fiber after alignment are shown in the middle part and the lower part of FIG. 4 as a mechanism for holding the optical fiber that is the object of alignment (the MCF 10 in the example shown in FIG. 4). FIG. 5 is a diagram showing an example of a configuration of a control unit constituting a part of the alignment device shown in the upper part of FIG. 4.

The alignment device shown in the upper part of FIG. 4 is a device for executing the optical fiber alignment method of the present disclosure and includes a light source 140A (indicated as "light source 1" in FIG. 4), a light source 140B (indicated as "light source 2" in FIG. 4), an alignment mechanism 130 (an alignment unit), the temporarily fixing jig 50, a camera 100, a memory 110 (an image acquisition unit), and a control unit 120. Although FIG. 4 shows the MCF 10 as the object of alignment, various optical fibers that require alignment as shown in FIG. 1 are applicable.

The light source 140A emits observation light into the MCF 10 from the rear end surface of the MCF 10 that is the object of alignment. On the other hand, the light source 140B emits observation light into the MCF 10 from the side surface of the MCF 10. The light emitted from both of the light source 140A and the light source 140B is released from the front end surface of the MCF 10, and an end surface image 100A of the MCF 10 is acquired by the camera 100 (an image acquisition step). That is, the light from the light source 140A and the light source 140B form a light-and-dark pattern of portions (a plurality of elements constituting the end surface) having different refractive indices in the MCF 10. For example, since the cladding and the marker are dark and the core is bright, the positions of the cladding, the core, and the marker can be checked from the light-and-dark pattern. The camera 100 acquires this light-and-dark pattern as the end surface image 100A.

In the upper part of FIG. 4, as an example, a core #1 to a core #8 are disposed at equal intervals with a center-to-center distance of 31 μm to surround the center of the cladding with an outer diameter of 125 μm (the center of the end surface), and the marker (indicated as "Marker" in the figure) is shown at a position shifted from the center of the end surface. The memory 110 records reference arrangement data (master data 110A) for defining an element arrangement of the MCF 10. The reference arrangement data is the known arrangement data recorded in the memory 110 in advance and includes the center positions of the elements constituting the end surface of the MCF 10, the dimensions of the elements, the center-to-center distance between the elements, and the like. This reference arrangement data is data used to identify a plurality of elements constituting the end surface of the MCF 10 that is the object of alignment, but it can also be used as data indicating a target element arrangement constituted by arbitrarily positioned target elements. The constituent elements of the end surface include the core #1 to the core #8, the marker 111, and the cladding (the common cladding in the example of FIG. 4) shown in the master data 110A in FIG. 4, as well as a portion displayed as a light-and-dark pattern in the end surface image 100A (for example, the stress applying portion 23 shown in FIG. 1). Further, a circle surrounding the core #1 to the core #8 and the marker 111 shown in FIG. 4 corresponds to the outer circumference of the cladding.

The control unit 120 controls the light source 140A, the light source 140B, and the camera 100 that execute the image acquisition step and controls the alignment mechanism 130 that executes the alignment of the MCF 10 (an alignment step). Further, as shown in FIG. 5, the control unit 120 includes a measurement unit 121 that executes measurement (a measurement step) of the elements constituting the end surface of the MCF 10 (substantially the glass fiber 13), an identification unit 122 that executes identification (an identification step) of the elements, and a calculation unit 123 that executes calculation the amount of deviation (a calculation step of the amount of deviation) between the element arrangement measured from the end surface image 100A and the arbitrarily set reference (the target element arrangement defined by the master data 110A or another MCF to be connected). Furthermore, the temporarily fixing jig 50 (50A) is set on a moving stage 124 for moving the temporarily fixing jig 50 (50A) in the directions indicated by an arrow T1 and an arrow T2, and the control unit 120 also controls the moving stage 124.

A simple configuration example of the alignment mechanism 130 is shown in the upper part of FIG. 4. However, as this alignment mechanism 130, for example, the alignment device disclosed in Patent Document 2 is applicable, and the entire Patent Document 2 is incorporated into herein by reference. In the "alignment device" shown in the upper part of FIG. 4, the alignment mechanism 130 includes a driving unit 131, a gripping member 132 that holds the side surface of the MCF 10 that is the object of alignment, and a rotating shaft 133 for rotating the gripping member 132 along the circumferential direction indicated by an arrow S4 around the fiber axis AX in a state where the gripping member 132 holds the MCF 10. A thread groove is formed on the side surface of the rotating shaft 133, and a protrusion provided on the end surface of the gripping member 132 is engaged with the thread groove. When the driving unit 131 rotates the rotating shaft 133 by a predetermined amount according to the control instruction from the control unit 120, the gripping member 132 holding the MCF 10 rotates along the circumferential direction indicated by the arrow S4 in conjunction with this rotation. As a result, alignment of the MCF 10 is performed.

The temporarily fixing jig 50 is disposed at the tip end portion of the MCF 10. As shown in the middle part of FIG. 4, the temporarily fixing jig 50 includes a lower member 51, an upper member 52, a hinge 53 for attaching the upper member 52 to the lower member 51 in a rotatable state. The lower member 51 has a contact surface 51a, and a V groove 51b that holds the tip end portion (the glass fiber 13) of the MCF 10 from which the resin coat 14 has been removed is formed in the contact surface 51a. On the other hand, the upper member 52 has a contact surface 52a. During the alignment work of the MCF 10, the contact surface 51a of the lower member 51 and the contact surface 52a of the upper member 52 are kept in a state of being separated from each other, and, after the alignment, the contact surface 52a of the upper member 52 is pressed against the contact surface 51a of the lower member 51, and thus the element arrangement in the end surface of the MCF 10 installed in the V groove 51b is held with respect to the temporarily fixing jig 50. The temporarily fixing jig 50 is installed on the moving stage 124 and is moved to a predetermined position by the driving control of the moving stage 124 by the control unit 120. After that, the aligned MCF 10 is fusion connected to another MCF 10 by the fusion device shown in the uppermost part of FIG. 3.

The temporarily fixing jig 50A shown in the lower part of FIG. 4 is also applicable to the alignment and fixing of the MCF 10. This temporarily fixing jig 50A functions as a holding means for the element arrangement in the end surface of the MCF 10 in order to install the MCF 10 after alignment on the mechanical splice element 80 shown at the lowermost part of FIG. 3. The temporarily fixing jig 50A includes a lower member 510, an upper member 520, and a hinge 530. The lower member 510 has a contact surface 510a, and a groove 510b for holding the side surface of the MCF 10 that is the object of alignment (the portion covered with the resin coat 14) is formed in the contact surface 510a. On the other hand, the upper member 520 has a contact surface 520a, and a groove 520b for holding the side surface of the MCF 10 is also formed in the contact surface 520a. During the alignment work of the MCF 10, the contact surface 510a of the lower member 510 and the contact surface 520a of the upper member 520 are kept in a state of being separated from each other, and, after the alignment, the contact surface 520a of the upper member 520 is pressed against the contact surface 510a of the lower member 510, and thus the element arrangement in the end surface of the MCF 10 installed in the groove 510b is held with respect to the temporarily fixing jig 50A. After that, the aligned MCF 10 is optically connected to another MCF 10 by the mechanical splice element 80 shown in the lowermost part of FIG. 3.

Figure 6:
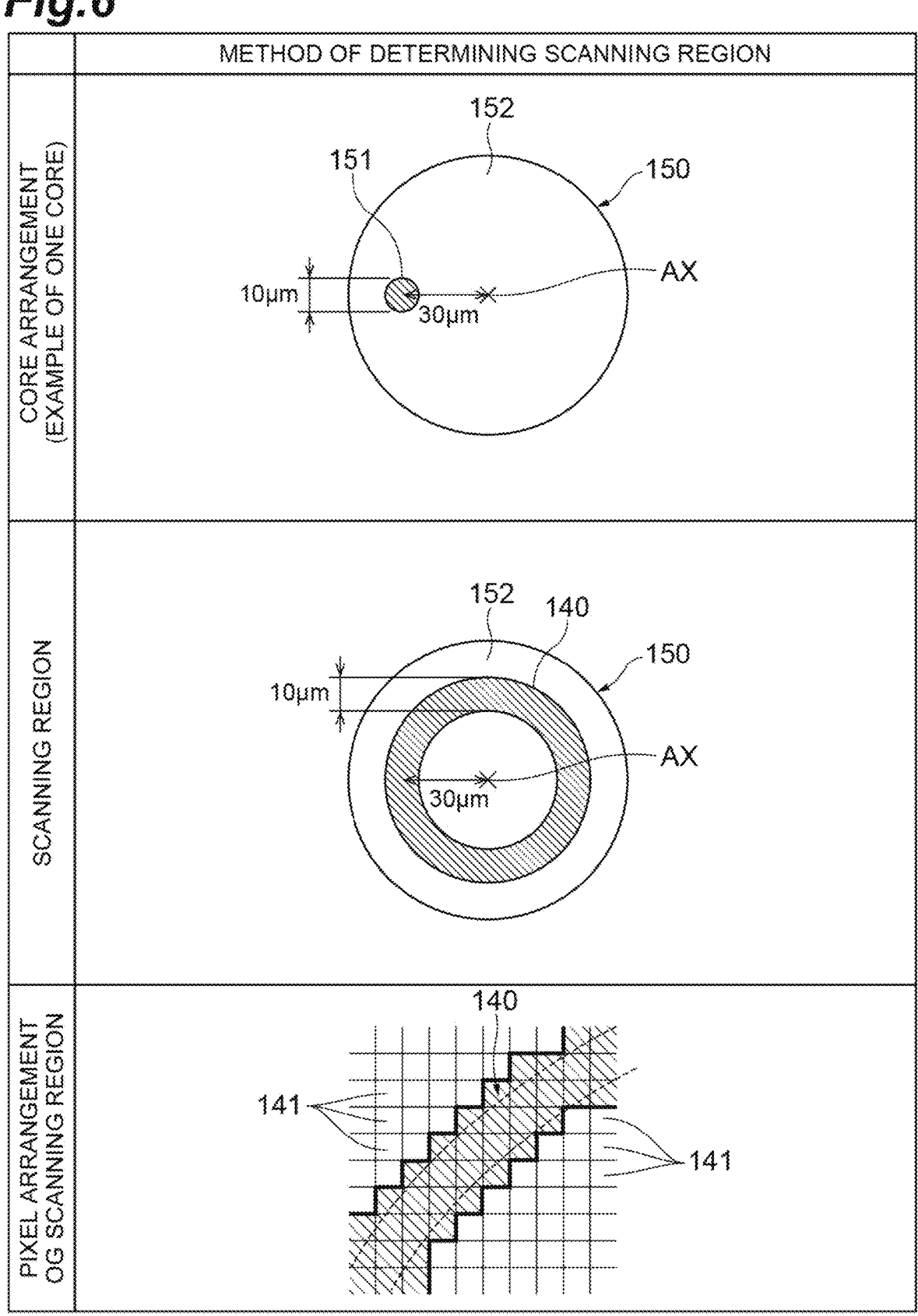
FIG. 6 is a view for explaining a method of specifying elements that constitute an end surface, particularly a core, from the acquired end surface image of the optical fiber.

FIG. 6 is a view for explaining a method of specifying elements that constitute the end surface, particularly the core, from the end surface image 100A of the object of alignment acquired by the camera 100 of the alignment device having the structure described above. An optical fiber 150 as the object of alignment shown in the upper part of FIG. 6 has one core 151 and a cladding 152 surrounding the core 151. The outer diameter of the core 151 is 10 μm, and the distance from the center of the cladding 152 (the center of the end surface intersecting with the fiber axis AX) to the center of the core 151 is 30 μm.

In the alignment method of the present disclosure, it is possible to reduce a scanning region for element search in the end surface image of the optical fiber 150 that is the object of alignment. The master data 110A (the reference arrangement data) recorded in the memory 110 in advance is used for such reduction of the scanning region.

Specifically, as described above, in a case where it is known from the master data 110A that the outer diameter of the core 151 of the optical fiber 150 is 10 μm and the distance from the center of the cladding 152 (which matches the fiber axis AX) to the center position of the core 151 is 30 μm, a scanning region 140 which has with a width of 10 μm and the center of which is located at a position of 30 μm away from the center of the cladding 152 is set as shown in the middle part of FIG. 6. Further, the setting of the scanning region 140 is executed in the measurement step of the optical fiber alignment method of the present disclosure.

The scanning region 140 described above is a range in which a search for pixels constituting the plurality of elements that constitute the end surface of the optical fiber 150 (the object of alignment) among pixels constituting the acquired end surface image 100A of the optical fiber 150 by the camera 100. Specifically, as shown in the lower part of FIG. 6, information on the light-and-dark pattern in the end surface image 100A is searched with respect to the pixels located within the hatched region set in the scanning region 140 among the pixels 141 constituting the end surface image 100A. Such setting of the scanning region 140 is such that in the measurement step of extracting the elements that constitute the fiber end surface such as the core and the marker from the end surface image 100A, scanning for pixel search only has to be performed for only the region where the core and the marker are assumed to exist. Therefore, the calculation time can be further reduced. Further, also in the identification step, by utilizing the known master data 110A, it is possible to accurately identify the elements that constitute the end surface of the optical fiber 150 in a short calculation time.

Figure 7:
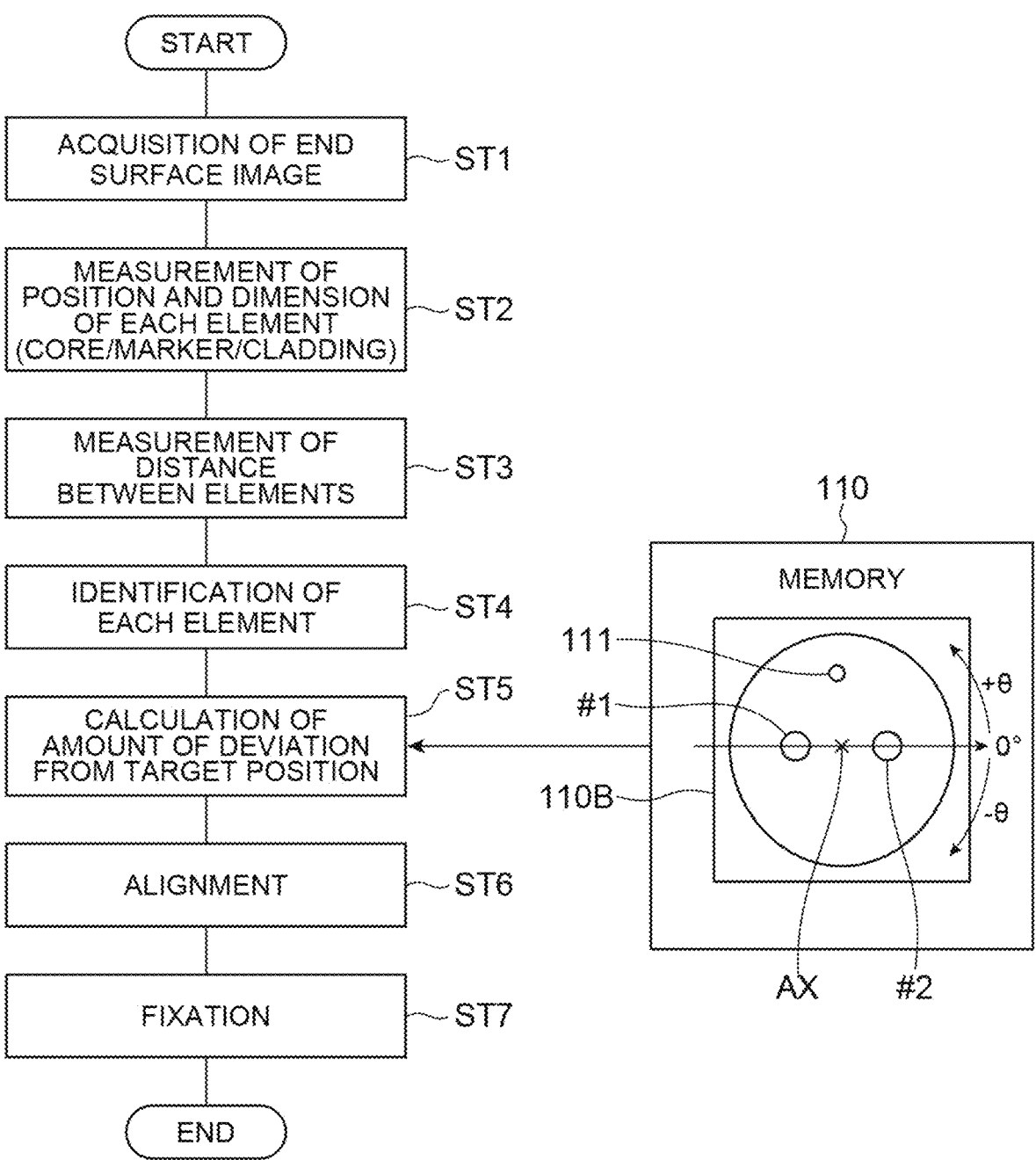
FIG. 7 is a flowchart for explaining a first embodiment of the optical fiber alignment method according to the present disclosure and the like (including fixation of the optical fiber after alignment and connection between the optical fibers disposed to face each other).

FIG. 7 is a flowchart for explaining a first embodiment of the optical fiber alignment method according to the present disclosure and the like (including fixation of the optical fiber after alignment and connection between the optical fibers disposed to face each other). FIG. 8 is a view showing a state of the end surface image of the optical fiber (an element arrangement) in each step of the flowchart shown in FIG. 7, and the steps shown in FIG. 7 and the steps shown in FIG. 8 match each other. It is assumed that master data 110B, which is the reference arrangement data, is recorded in the memory 110 of the alignment device shown in the upper part of FIG. 4. In the example shown in FIG. 7, the master data 110B is the reference arrangement data with the core #1,the core #2,and the marker 111 disposed in the common cladding, and a circle surrounding the core #1, the core #2, and the marker 111 corresponds to the outer circumference of the common cladding.

Further, with a straight line passing through the centers of the core #1 and the core #2 as a reference (azimuth information), the amount of deviation toward the side where the marker 111 is located is represented by "+0," and the amount of deviation of the marker 111 toward the opposite side is represented by "−0". In FIG. 8, an arrow S5 indicates the circumferential direction in which the object of alignment is rotated around the fiber axis AX.

The first embodiment of the optical fiber alignment method of the present disclosure, which is shown in the flowchart of FIG. 7, is also applicable to the alignment of both of two optical fibers that are directly connected or optically connected to each other by a predetermined connection device, in addition to the alignment of the optical fibers fixed to a predetermined fixing jig (the various optical fibers shown in FIG. 1).

In the alignment method of the first embodiment, by rotating the optical fiber that is the object of alignment, or at least one of the two optical fibers to be optically connected to each other, which is selected as the object of alignment, in the circumferential direction around the fiber axis AX, the plurality of elements that constitute the end surface of the optical fiber are moved a target position that can be arbitrarily set (the target element arrangement constituted by the target elements located at the target positions) (alignment work).

Specifically, in the image acquisition step, an end surface image of the optical fiber that is the object of alignment is acquired by the camera 100 while the optical fiber is irradiated with light (step ST1). The state of the end surface image 100A acquired in this image acquisition step is shown in step ST1 of FIG. 8. In a case where two optical fibers are optically connected to each other, in this image acquisition step, the end surface images of the two optical fibers are acquired while these two optical fibers are irradiated with light.

In the measurement step, from the end surface image 100A obtained in the image acquisition step (step ST1), as arrangement data relating to the plurality of elements, at least center position data of each of the plurality of elements and dimension data of each of the plurality of elements are measured (step ST2), and then center-to-center distance data between the plurality of elements (including distance data from the center of the cladding to the center of each element) is measured (step ST3). The state of the end surface image 100A in this measurement step is shown in steps ST2 and ST3 of FIG. 8. In a case where two optical fibers are optically connected to each other, in this measurement step, the arrangement data of the two optical fibers are measured from each of the end surface images 100A of the two optical fibers.

In the subsequent identification step, the arrangement data obtained in the measurement step is compared with the master data 110B (the reference arrangement data), which is the known arrangement data recorded in the memory 110 in advance, and a correspondence relationship between the plurality of elements in the end surface image 100A and a plurality of reference elements defined by the master data 110B is specified. As a result, the plurality of elements in the end surface image 100A are identified (step ST4). The state of the end surface image 100A in this identification step is shown in step ST4 of FIG. 8. In a case where two optical fibers are optically connected to each other, in this identification step, the arrangement data of one of the optical fibers which is the object of alignment and the known arrangement data relating to the plurality of elements recorded in advance or the reference arrangement data set by the arrangement data of the other of the optical fibers which is measured in the measurement step. Further, a correspondence relationships between the plurality of elements in the end surface image 100A of one of the optical fibers which is the object of alignment and the plurality of reference elements defined by the reference arrangement data is also specified. As a result, the plurality of elements in each of the end surface images of the two optical fibers is identified.

In the calculation step, on the basis of the identification result obtained in the identification step (step ST4), the amount of deviation of the element arrangement constituted by the plurality of elements in the end surface image 100A from the target element arrangement constituted by the plurality of target elements located at arbitrarily set target positions is calculated (step ST5). In other words, for each of the elements that constitute the element arrangement of the object of alignment, the amount of deviation from each of the target positions where the corresponding target elements among the target elements that constitute the target element arrangement are located is calculated. The state of the end surface image 100A in this calculation step is shown in step ST5 of FIG. 8. The target element arrangement in the present embodiment is the reference element arrangement defined by the master data 110B. Further, also in a case where two optical fibers are optically connected to each other, similarly, on the basis of the identification result obtained in the identification step, the amount of deviation of the element arrangement constituted by the plurality of elements in the end surface image 100A of one of the optical fibers which is the object of alignment from the target element arrangement is calculated.

In the alignment step, the optical fiber that is the object of alignment is rotated in the circumferential direction (the arrow S5 shown in step ST6 in FIG. 8) around the fiber axis AX to reduce the amount of deviation obtained in the calculation step, and thus the alignment of the optical fiber is performed (step ST6). The state of the end surface image 100A in this alignment step is shown in step ST6 of FIG. 8. In a case where two optical fibers are optically connected to each other, one of the optical fibers which is the object of alignment is rotated in the circumferential direction around the fiber axis AX to reduce the amount of deviation obtained in the calculation step, and thus the alignment between the two optical fibers is performed. In the example of the present embodiment, in a case where the element arrangement of the optical fiber that is the object of alignment deviates from the element arrangement of the master data 110B by +0, the alignment is performed by rotating the object of alignment by −0.

After the alignment of the optical fibers each of which is the object of alignment has been completed as described above, the optical fibers after alignment are fixed to various fixing members shown in FIG. 2 (step ST7).

Figure 9:
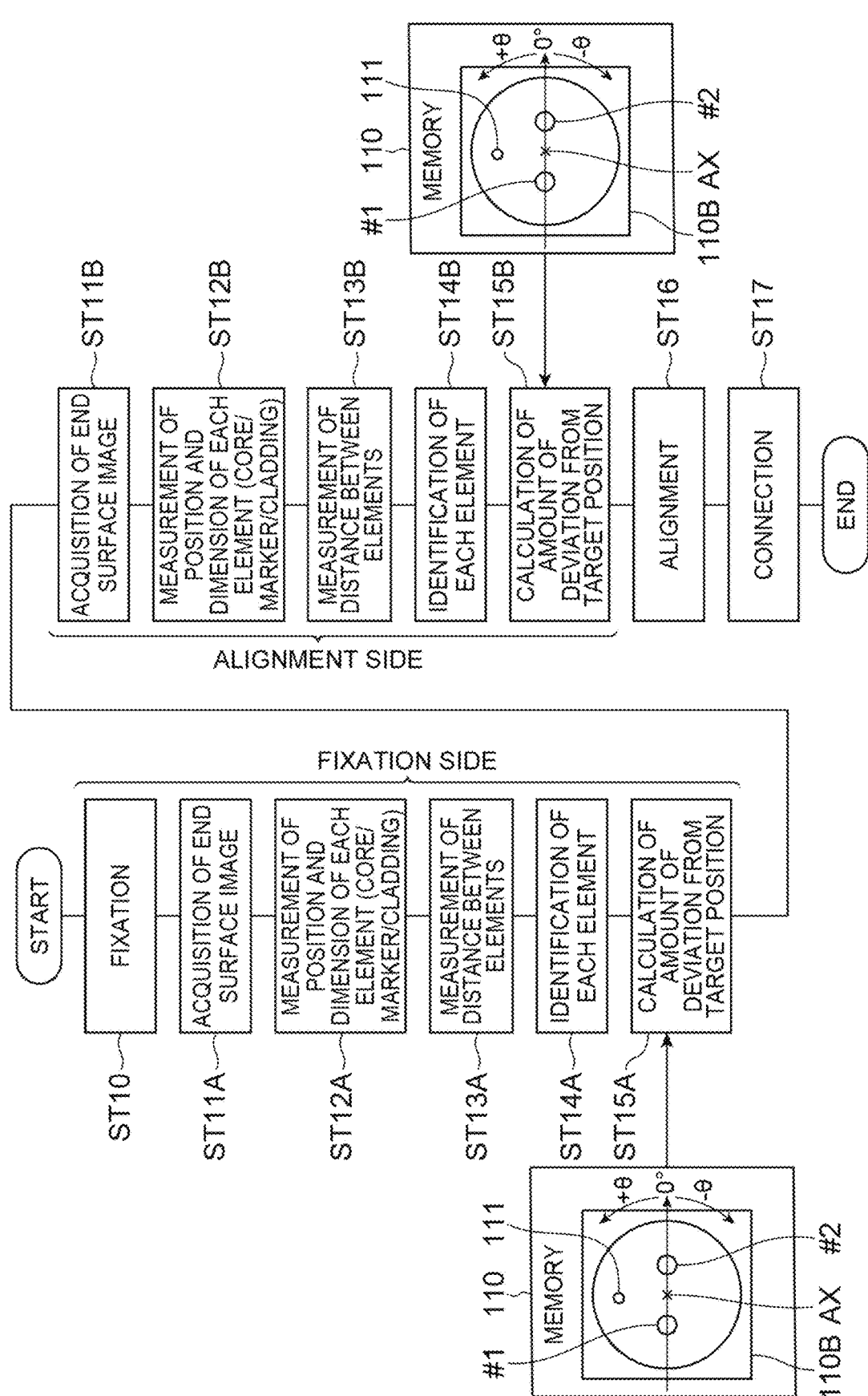
FIG. 9 is a flowchart for explaining a second embodiment of the optical fiber alignment method according to the present disclosure and the like (including fixation of the optical fiber after alignment and connection between the optical fibers disposed to face each other).

FIG. 9 is a flowchart for explaining a second embodiment of the optical fiber alignment method according to the present disclosure and the like (including fixation of the optical fiber after alignment and connection between the optical fibers disposed to face each other). In this second embodiment, of the two optical fibers to be optically connected to each other, one corresponds to the optical fiber on the fixation side A and the other corresponds to the optical fiber on the alignment side B, as shown in FIG. 3. In this second embodiment, by rotating the optical fiber on the alignment side (the object of alignment) in the circumferential direction around the fiber axis AX, the plurality of elements that constitute the end surface of the optical fiber on the alignment side are moved to the positions of the plurality of elements of the optical fiber on the fixation side set in the target element arrangement (the target positions).

In FIG. 9, as image acquisition steps, step ST11A on the fixation side and step ST11B on the alignment side perform substantially the same processing except for a difference in an object of processing. As measurement steps, steps ST12A and ST13A on the fixation side and steps ST12B and ST13B on the alignment side also perform similar processing. As identification steps, step ST14A on the fixation side and step ST14B on the alignment side also perform the same processing. As calculation steps, step ST15A on the fixation side and step ST15B on the alignment side also perform the same processing.

First, one of the two optical fibers to be optically connected to each other is fixed to the fixing member shown in FIG. 2, for example, as the optical fiber on the fixation side A shown in FIG. 3 (step ST10). As a result, the element arrangement in the end surface of the optical fiber on the fixation side is held with respect to the fixing member as the target element arrangement.

Next, in the processing of the optical fiber on the fixation side, in the image acquisition step, the end surface image 100A of the optical fiber on the fixation side is acquired by the camera 100 while the optical fiber on the fixation side is irradiated with light (step ST11A). In the measurement step, from the end surface image 100A of the optical fiber on the fixation side, as arrangement data relating to the plurality of elements, center position data of each of the plurality of elements and dimension data of each of the plurality of elements are measured (step ST12A), and center-to-center distance data between the plurality of elements is measured (step ST13A). In the identification step, the arrangement data of the optical fiber on the fixation side is compared with the master data 110B (the reference arrangement data which is the known arrangement data) recorded in the memory 110, and a correspondence relationship between the plurality of elements in the end surface image 100A of the optical fiber on the fixation side and a plurality of reference elements defined by the master data 110B is specified, and thus the plurality of elements in the end surface image 100A of the optical fiber on the fixation side are identified (step ST14A). In the calculation step, on the basis of the identification result obtained in the identification step (step ST14A), the intermediate amount of deviation of the element arrangement constituted by the plurality of elements in the end surface image 100A of the optical fiber on the fixation side from the reference element arrangement defined by the master data 110B is calculated (step ST15A). In step ST15A, the positions of the reference elements that constitute the reference element arrangement correspond to the target positions that serve as the reference for calculating the intermediate amount of deviation. The obtained intermediate amount of deviation is used to calculate the amount of deviation of the element arrangement of the optical fiber on the alignment side from the target element arrangement when the element arrangement of the optical fiber on the fixation side is set to the target element arrangement.

Subsequently, the same processing as that for the optical fiber on the fixation side is performed on the optical fiber on the alignment side. That is, in the processing of the optical fiber on the alignment side, in the image acquisition step, the end surface image 100A of the optical fiber on the alignment side is acquired by the camera 100 while the optical fiber on the alignment side is irradiated with light (step ST11B). In the measurement step, from the end surface image 100A of the optical fiber on the alignment side, as arrangement data relating to the plurality of elements, center position data of each of the plurality of elements and dimension data of each of the plurality of elements are measured (step ST12B), and center-to-center distance data between the plurality of elements is measured (step ST13B). In the identification step, the arrangement data of the optical fiber on the alignment side is compared with the master data 110B recorded in the memory 110, and a correspondence relationship between the plurality of elements in the end surface image 100A of the optical fiber on the alignment side and a plurality of reference elements defined by the master data 110B is specified, and thus the plurality of elements in the end surface image 100A of the optical fiber on the alignment side are identified (step ST14B). In the calculation step, on the basis of the identification result obtained in the identification step (step ST14A and step ST14B) for both the fixation side and the alignment side, the amount of deviation of the element arrangement constituted by the plurality of elements in the end surface image 100A of the optical fiber on the alignment side from the target element arrangement (the amount of deviation from of each of the target positions) is calculated (step ST15B). That is, the amount of deviation of the element arrangement of the optical fiber on the alignment side from the element arrangement of the optical fiber on the fixation side installed in the target element arrangement is calculated from the intermediate amount of deviation of the element arrangement of the optical fiber on the fixation side from the reference element arrangement (the master data 110B) obtained in step ST15A and the intermediate amount of deviation of the element arrangement of the optical fiber on the alignment side from the reference element arrangement. In the alignment step, the optical fiber on the alignment side is rotated in the circumferential direction around the fiber axis AX to reduce the amount of deviation obtained in the calculation step, and thus the alignment between the optical fiber on the fixation side and the optical fiber on the alignment side is performed (step ST16). As an example, in a case where the element arrangement (the target element arrangement) of the optical fiber on the fixation side deviates from the reference element arrangement by +3° and the element arrangement of the optical fiber on the alignment side deviates from the reference element arrangement by −7°, the amount of deviation of the element arrangement of the optical fiber on the alignment side from the target element arrangement is +10°. Therefore, by rotating the optical fiber on the alignment side by +10°, it is possible to match the core arrangements of both the optical fiber on the fixation side and the optical fiber on the alignment side each other.

When the alignment work for both the optical fiber on the fixation side and the optical fiber on the alignment side is completed as described above, the optical fiber on the fixation side and the optical fiber on the alignment side are optically connected to each other as shown in FIG. 3 in a state where they are fixed to the fixing member shown in FIG. 2, for example (step ST17).

FIG. 10 is a flowchart for explaining a third embodiment of the optical fiber alignment method according to the present disclosure and the like (including fixation of the optical fiber after alignment and connection between the optical fibers disposed to face each other). Also in this third embodiment, of the two optical fibers to be optically connected to each other, one corresponds to the optical fiber on the fixation side A and the other corresponds to the optical fiber on the alignment side B, as shown in FIG. 3. By rotating the optical fiber on the alignment side (the object of alignment) in the circumferential direction around the fiber axis AX, the plurality of elements that constitute the end surface of the optical fiber on the alignment side are moved to the positions of the plurality of elements of the optical fiber on the fixation side set in the target element arrangement (the target positions). However, in the second embodiment described above, the "amount of deviation" between the optical fiber on the fixation side and the optical fiber on the alignment side is calculated using the master data 110B different from the arrangement data in addition to the arrangement data measured for each of the optical fiber on the fixation side and the optical fiber on the alignment side.

On the other hand, in the third embodiment, the "amount of deviation" between the optical fiber on the fixation side and the optical fiber on the alignment side is calculated using the arrangement data relating to the element arrangement of an optical fiber A1 on a first measured side (hereinafter, a reference optical fiber selected from a group of the optical fiber on the fixation side and the optical fiber on the alignment side is described as an "optical fiber A1," and the remaining non-selected optical fiber is described as an "optical fiber B1") instead of the master data 110B when the "amount of deviation" is calculated.

First, one of the two optical fibers to be optically connected to each other is fixed to the fixing member shown in FIG. 2, for example, as the optical fiber on the fixation side A shown in FIG. 3 (step ST20). As a result, the element arrangement in the end surface of the optical fiber on the fixation side is held with respect to the fixing member as the target element arrangement.

Next, in the processing of the optical fiber A1 on the first measured side, in an image acquisition step (a reference image acquisition step), the end surface image 100A of the optical fiber A1 is acquired by the camera 100 while the optical fiber A1 is irradiated with light (step ST21A). In the following steps, text data 110C for defining the element arrangement of the optical fiber A1 is created for use as the master data. In a measurement step (a reference arrangement data measurement step), from the end surface image 100A of the optical fiber A1, as arrangement data relating to the plurality of elements, center position data of each of the plurality of elements and dimension data of each of the plurality of elements are measured (step ST22A), and center-to-center distance data between the plurality of elements is measured (step ST23A). The text data 110C is created from the obtained arrangement data, and the created text data 110C is recorded in the memory 110 in order to use the text data 110C for calculating the amount of deviation for alignment, which will be described below (step ST25).

Subsequently, in the processing of the optical fiber B1, in the image acquisition step, the end surface image 100A of the optical fiber B1 is acquired by the camera 100 while the optical fiber B1 is irradiated with light (step ST21B). In the measurement step, from the end surface image 100A of the optical fiber B1, as arrangement data relating to the plurality of elements, center position data of each of the plurality of elements and dimension data of each of the plurality of elements are measured (step ST22B), and center-to-center distance data between the plurality of elements is measured (step ST23B). In the identification step, the arrangement data of the optical fiber B1 is compared with the text data 110C (not shown) recorded in the memory 110, and a correspondence relationship between the plurality of elements in the end surface image 100A of the optical fiber B1 and a plurality of reference elements defined by the text data 110C is specified, and thus the plurality of elements in the end surface image 100A of the optical fiber B1 are identified (step ST24). In the calculation step, on the basis of the identification result obtained in the identification step (step ST24), the amount of deviation between the element arrangement constituted by the plurality of elements in the end surface image 100A of the optical fiber B1 and the text data 110C (the amount of deviation from of each of the target positions) is calculated (step ST26). In the alignment step, the optical fiber on the alignment side is rotated in the circumferential direction around the fiber axis AX to reduce the amount of deviation obtained in the calculation step, and thus the alignment between the optical fiber on the fixation side and the optical fiber on the alignment side is performed (step ST27).

When the alignment work for both the optical fiber on the fixation side and the optical fiber on the alignment side is completed as described above, the optical fiber on the fixation side and the optical fiber on the alignment side are optically connected to each other as shown in FIG. 3 in a state where they are fixed to the fixing member shown in FIG. 2, for example (step ST28).

Appendix 1

An optical fiber alignment method for moving a plurality of elements constituting an end surface of an optical fiber that is an object of alignment to arbitrarily set target positions by rotating the optical fiber around a central axis of the optical fiber, the method comprising:

an image acquisition step of acquiring an end surface image of the optical fiber while irradiating the optical fiber with light;

a measurement step of measuring center position data of each of the plurality of elements, dimension data of each of the plurality of elements, and center-to-center distance data between the plurality of elements as arrangement data relating to the plurality of elements from the end surface image of the optical fiber;

an identification step of identifying the plurality of elements in the end surface image by comparing the arrangement data of the optical fiber with reference arrangement data that is the known arrangement data relating to the plurality of elements recorded in advance and specifying a correspondence relationship between the plurality of elements in the end surface image and a plurality of reference elements defined by the reference arrangement data;

a calculation step of calculating an amount of deviation of an element arrangement constituted by the plurality of elements in the end surface image from a target element arrangement constituted by a plurality of target elements located at the target positions on the basis of the identification result obtained in the identification step; and an alignment step of performing alignment of the optical fiber by rotating the optical fiber around the central axis such that the amount of deviation obtained in the calculation step is reduced.

Appendix 2

An optical fiber alignment method for moving a plurality of elements constituting an end surface of an object of alignment to arbitrarily set target positions by selecting both of first and second optical fibers to be optically connected to each other or the second optical fiber as the object of alignment and rotating the object of alignment around a central axis of the object of alignment, the method comprising:

an image acquisition step of acquiring an end surface image of each of the first and second optical fibers while irradiating each of the first and second optical fibers with light;

a measurement step of measuring center position data of each of the plurality of elements, dimension data of each of the plurality of elements, and center-to-center distance data between the plurality of elements as arrangement data relating to the plurality of elements of each of the first and second optical fibers from each of the end surface images of the first and second optical fibers;

an identification step of identifying the plurality of elements in each of the end surface images of the first and second optical fibers by comparing each of the arrangement data of the first and second optical fibers with reference arrangement data that is the known arrangement data relating to the plurality of elements recorded in advance and specifying a correspondence relationship between the plurality of elements in the end surface image of each of the first and second optical fibers and a plurality of reference elements defined by the reference arrangement data;

a calculation step of calculating an amount of deviation of an element arrangement constituted by the plurality of elements in the end surface image of the object of alignment from a target element arrangement constituted by a plurality of target elements located at the target positions on the basis of the identification result obtained in the identification step; and an alignment step of performing alignment between the first and second optical fibers by rotating the object of alignment around the central axis such that the amount of deviation obtained in the calculation step is reduced.

Appendix 3

An optical fiber alignment method for selecting, among first and second optical fibers to be optically connected to each other, the second optical fiber as an object of alignment in a state where an element arrangement of a plurality of elements constituting an end surface of the first optical fiber is fixed as a target element arrangement and rotating the object of alignment around a central axis of the object of alignment such that the plurality of elements of the first optical fiber and a plurality of elements constituting an end surface of the second optical fiber overlap each other, the method comprising:

a reference image acquisition step of acquiring an end surface image of a reference optical fiber selected from a group of the first and second optical fibers while irradiating the reference optical fiber with light;

a reference arrangement data measurement step of measuring and recording center position data of each of the plurality of elements of the reference optical fiber, dimension data of each of the plurality of elements of the reference optical fiber, and center-to-center distance data between the plurality of elements of the reference optical fiber as reference arrangement data from the end surface image of the reference optical fiber;

an image acquisition step of acquiring an end surface image of a non-selected optical fiber different from the reference optical fiber selected from the group of the first and second optical fibers while irradiating the non-selected optical fiber with light;

a measurement step of measuring center position data of each of the plurality of elements of the non-selected optical fiber, dimension data of each of the plurality of elements of the non-selected optical fiber, and center-to-center distance data between the plurality of elements of the non-selected optical fiber as arrangement data relating to the plurality of elements of the non-selected optical fiber from the end surface image of the non-selected optical fiber;

an identification step of identifying the plurality of elements in each of the end surface images of the reference optical fiber and the non-selected optical fiber by comparing the arrangement data of the non-selected optical fiber with reference arrangement data and specifying a correspondence relationship between the plurality of elements in the end surface image of the non-selected optical fiber and a plurality of reference elements defined by the reference arrangement data;

a calculation step of calculating an amount of deviation between an element arrangement constituted by the plurality of elements in the end surface image of the non-selected optical fiber and the target element arrangement on the basis of the identification result obtained in the identification step; and an alignment step of performing alignment between the first and second optical fibers by rotating the second optical fiber that is the object of alignment around the central axis such that the amount of deviation obtained in the calculation step is reduced.

Appendix 4

An alignment device for moving a plurality of elements constituting an end surface of an optical fiber that is an object of alignment to arbitrarily set target positions by rotating the optical fiber around a central axis of the optical fiber, the device comprising:

an image acquisition unit configured to acquire an end surface image of the optical fiber with respect to the optical fiber;

a measurement unit configured to measure center position data of each of the plurality of elements, dimension data of each of the plurality of elements, and center-to-center distance data between the plurality of elements as arrangement data relating to the plurality of elements from the end surface image acquired by the image acquisition unit;

an identification unit configured to identify the plurality of elements in the end surface image by comparing the arrangement data of the optical fiber with reference arrangement data that is the known arrangement data relating to the plurality of elements recorded in advance and specifying a correspondence relationship between the plurality of elements in the end surface image and a plurality of reference elements defined by the reference arrangement data;

a calculation unit configured to calculate an amount of deviation of an element arrangement constituted by the plurality of elements in the end surface image from a target element arrangement constituted by a plurality of target elements located at the target positions on the basis of the identification result obtained by the identification unit; and an alignment unit configured to perform alignment of the optical fiber by rotating the optical fiber around the central axis such that the amount of deviation obtained by the calculation unit is reduced.

Appendix 5

A connection device for an optical fiber aligned by moving a plurality of elements constituting an end surface of the optical fiber that is an object of alignment to arbitrarily set target positions by rotating the optical fiber around a central axis of the optical fiber, the device comprising: an image acquisition unit configured to acquire an end surface image of the optical fiber with respect to the optical fiber;

a measurement unit configured to measure center position data of each of the plurality of elements, dimension data of each of the plurality of elements, and center-to-center distance data between the plurality of elements as arrangement data relating to the plurality of elements from the end surface image acquired by the image acquisition unit;

an identification unit configured to identify the plurality of elements in the end surface image by comparing the arrangement data of the optical fiber with reference arrangement data that is the known arrangement data relating to the plurality of elements recorded in advance and specifying a correspondence relationship between the plurality of elements in the end surface image and a plurality of reference elements defined by the reference arrangement data;

a calculation unit configured to calculate an amount of deviation of an element arrangement constituted by the plurality of elements in the end surface image from a target element arrangement constituted by a plurality of target elements located at the target positions on the basis of the identification result obtained by the identification unit;

an alignment unit configured to perform alignment of the optical fiber by rotating the optical fiber around the central axis such that the amount of deviation obtained by the calculation unit is reduced; and a fixing jig for holding the element arrangement of the aligned object of alignment.

REFERENCE SIGNS LIST

10 . . . MCF (multi-core optical fiber)
11, 21, 151, 321, #1 to #8 . . . Core
12 . . . Common cladding
13, 24, 320 . . . Glass fiber
14, 25 . . . Resin coat
20 . . . Polarization-maintaining optical fiber
22, 152, 322 . . . Cladding
23 . . . Stress applying portion
30 . . . Bundle fiber
31 . . . Housing
31A . . . Front end surface
31B . . . Rear end surface
32 . . . Single-core optical fiber
33 . . . Front opening
34 . . . Accommodation space
50, 50A . . . Temporarily fixing jig
51, 71, 81, 510 . . . Lower member
52, 72, 82, 520 . . . Upper member
55A, 55B . . . Discharge electrode
56 . . . Fusion portion
57 . . . Guide groove
51a, 52a, 510a, 520a . . . Contact surface
51b, 710 . . . V groove
81a, 82a, 510b, 520b . . . Groove
53, 530 . . . Hinge
60 . . . Ferrule
61 . . . Ferrule end surface
62 . . . Sleeve
70 . . . Fiber array
73 . . . Guide member
75 . . . Joint portion
76 . . . Adhesive (ultraviolet curable resin)
80 . . . Mechanical splice element
100 . . . Camera
100A . . . End surface image 110 . . . Memory
110A, 110B . . . Master data
110C . . . Text data
111 . . . Marker
120 . . . Control unit
121 . . . Measurement unit
122 . . . Identification unit
123 . . . Calculation unit
124 . . . Moving stage
130 . . . Alignment mechanism (alignment unit)
131 . . . Driving unit
132 . . . Gripping member
133 . . . Rotating shaft
140A, 140B . . . Light source
150 . . . Optical fiber
140 . . . Scanning region
141 . . . Pixel
A . . . Fixation side
B . . . Alignment side
AX . . . Fiber axis (central axis)
S1 to S5, T1, T2 . . . Arrow

The invention claimed is:

1. An optical fiber alignment method for moving a plurality of elements constituting an end surface of an optical fiber that is an object of alignment to arbitrarily set target positions by rotating the optical fiber around a central axis of the optical fiber, the method comprising:

a reference image acquisition step of acquiring an end surface image of a reference optical fiber selected from a group of first and second optical fibers;

a reference arrangement data measurement step of measuring and recording arrangement data relating to a plurality of elements constituting the end surface of the reference optical fiber as reference arrangement data from the end surface image of the reference optical fiber;

an image acquisition step of acquiring an end surface image of the optical fiber;

a measurement step of measuring arrangement data relating to the plurality of elements from the end surface image of the optical fiber;

a calculation step of calculating an amount of deviation of each of the plurality of elements from a target element arrangement in which the plurality of elements should be located from a correspondence relationship of the elements between the arrangement data and the reference arrangement data for element identification recorded in advance; and an alignment step of performing alignment of the optical fiber by rotating the optical fiber around the central axis such that the amount of deviation is reduced, wherein under a setting in which the second optical fiber is selected as the object of alignment in a state where the element arrangement of the first optical fiber is fixed as the target element arrangement, in the image acquisition step, an end surface image of a non-selected optical fiber different from the reference optical fiber selected from the group of the first and second optical fibers is acquired as the end surface image of the optical fiber, in the measurement step, arrangement data relating to a plurality of elements constituting an end surface of the non-selected optical fiber is measured as the arrangement data of the optical fiber from the end surface image of the non-selected optical fiber, in the calculation step:

a correspondence relationship between the plurality of elements of the non-selected optical fiber and a plurality of reference elements defined by the reference arrangement data is specified as the correspondence relationship on the basis of a comparison between the arrangement data of the non-selected optical fiber and the reference arrangement data, and an amount of deviation between an element arrangement constituted by the plurality of elements of the non-selected optical fiber and the target element arrangement is calculated, and in the alignment step, alignment between the first and second optical fibers is performed by rotating the second optical fiber around the central axis such that the amount of deviation is reduced, and an element arrangement of a plurality of elements constituting an end surface of the first optical fiber and an element arrangement of a plurality of elements constituting an end surface of the second optical fiber overlap each other.

2. The optical fiber alignment method according to claim 1, wherein the target element arrangement serving as a reference for calculating the amount of deviation in the calculation step is an element arrangement of a plurality of reference elements defined by the reference arrangement data.

3. The optical fiber alignment method according to claim 1, wherein, in measurement of the arrangement data, a scanning region of a pixel search is set on the end surface image on the basis of the reference arrangement data as a range in which a search for pixels constituting the plurality of elements in the object of alignment among pixels of the end surface image is performed.

4. The optical fiber alignment method according to claim 1, wherein the arrangement data includes center position data of each of the plurality of elements, dimension data of each of the plurality of elements, and center-to-center distance data between the plurality of elements, wherein the reference arrangement data is the known arrangement data relating to the plurality of elements, and wherein the correspondence relationship is determined by determining types of the plurality of elements displayed on the end surface image on the basis of a comparison between the dimension data included in the reference arrangement data and the dimension data included in the measured arrangement data, and comparing a positional relationship of a plurality of reference elements defined by the center position data and the center-to-center distance data included in the reference arrangement data with a positional relationship of the plurality of elements included in the measured arrangement data.

5. The optical fiber alignment method according to claim 1, wherein the object of alignment includes at least one of a multi-core optical fiber, a polarization-maintaining fiber, and a bundle fiber.

6. An alignment device for executing the optical fiber alignment method according to claim 1.

7. A connection device comprising a fixing jig for holding the element arrangement of the object of alignment aligned by the optical fiber alignment method according to claim 1.

8. The connection device according to claim 7, wherein the fixing jig includes any one of a temporarily fixing jig that detachably holds the object of alignment, a ferrule that is installed on a tip end portion of the object of alignment including the end surface and constitutes a part of an optical connector, and a fiber array in which tip end portions of a plurality of optical fibers including the object of alignment are installed.

9. A connection device for optically connecting the first and second optical fibers including the object of alignment aligned by the optical fiber alignment method according to claim 1 to each other in a state where the element arrangement of each of the first and second optical fibers is held.

10. The connection device according to claim 9 comprising a fusion device for fusion connecting the end surface of the first optical fiber and the end surface of the second optical fiber to each other.

11. The connection device according to claim 9 comprising a mechanical splice element for optically connecting the first and second optical fibers to each other via a refractive index matching agent.

* * * * *